United States Patent
Choi et al.

(10) Patent No.: US 10,666,305 B2
(45) Date of Patent: May 26, 2020

(54) SYSTEMS AND METHODS FOR LINEARIZED-MIXER OUT-OF-BAND INTERFERENCE MITIGATION

(71) Applicant: Kumu Networks, Inc., Sunnyvale, CA (US)

(72) Inventors: Jung-Il Choi, Sunnyvale, CA (US); Mayank Jain, Sunnyvale, CA (US); Christian Hahn, Sunnyvale, CA (US)

(73) Assignee: Kumu Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/518,576

(22) Filed: Jul. 22, 2019

(65) Prior Publication Data

US 2019/0372610 A1    Dec. 5, 2019

Related U.S. Application Data

(63) Continuation-in-part of application No. 16/262,045, filed on Jan. 30, 2019, now Pat. No. 10,404,297.

(Continued)

(51) Int. Cl.
*H04B 1/04* (2006.01)
*H04B 1/10* (2006.01)

(52) U.S. Cl.
CPC .............. *H04B 1/0475* (2013.01); *H04B 1/10* (2013.01); *H04B 1/109* (2013.01); *H04B 1/1027* (2013.01);

(Continued)

(58) Field of Classification Search
CPC combination set(s) only.
See application file for complete search history.

(56) References Cited

U.S. PATENT DOCUMENTS

| | | | |
|---|---|---|---|
| 3,922,617 A | 11/1975 | Denniston et al. | |
| 4,321,624 A | 3/1982 | Gibson et al. | |

(Continued)

FOREIGN PATENT DOCUMENTS

| | | | |
|---|---|---|---|
| EP | 0755141 A3 | 10/1998 | |
| EP | 1959625 B1 | 2/2009 | |

(Continued)

OTHER PUBLICATIONS

International Search Report and Written Opinion for International Application No. PCT/US18/24600 dated Jun. 14, 2018.

(Continued)

*Primary Examiner* — Linda Wong
(74) *Attorney, Agent, or Firm* — Jeffrey Schox; Samuel Rosenthal

(57) ABSTRACT

A system for linearized-mixer interference mitigation includes first and second linearized frequency downconverters; a sampling analog interference filtering system that, in order to remove interference in the transmit band, filters the sampled BB transmit signal to generate a cleaned BB transmit signal; an analog interference canceller that transforms the cleaned BB transmit signal to a BB interference cancellation signal; and a first signal coupler that combines the BB interference cancellation signal and the BB receive signal in order to remove a first portion of receive-band interference.

12 Claims, 21 Drawing Sheets

Related U.S. Application Data which is a continuation of application No. 15/706,547, filed on Sep. 15, 2017, now Pat. No. 10,230,410, which is a continuation of application No. 15/378,180, filed on Dec. 14, 2016, now Pat. No. 9,800,275.

(60) Provisional application No. 62/268,400, filed on Dec. 16, 2015, provisional application No. 62/857,482, filed on Jun. 5, 2019.

(52) U.S. Cl.
CPC ... *H04B 1/1036* (2013.01); *H04B 2001/0491* (2013.01); *H04B 2001/1045* (2013.01); *H04B 2001/1072* (2013.01)

(56) References Cited

U.S. PATENT DOCUMENTS

| | | | |
|---|---|---|---|
| 4,952,193 A | 8/1990 | Talwar | |
| 5,212,827 A | 5/1993 | Meszko et al. | |
| 5,691,978 A | 11/1997 | Kenworthy | |
| 5,734,967 A | 3/1998 | Kotzin et al. | |
| 5,790,658 A | 8/1998 | Yip et al. | |
| 5,818,385 A | 10/1998 | Bartholomew | |
| 5,930,301 A | 7/1999 | Chester et al. | |
| 6,215,812 B1 | 4/2001 | Young et al. | |
| 6,240,150 B1 | 5/2001 | Darveau et al. | |
| 6,411,250 B1 | 6/2002 | Oswald et al. | |
| 6,539,204 B1 | 3/2003 | Marsh et al. | |
| 6,567,649 B2 | 5/2003 | Souissi | |
| 6,580,771 B2 | 6/2003 | Kenney | |
| 6,639,551 B2 | 10/2003 | Li et al. | |
| 6,657,950 B1 | 12/2003 | Jones et al. | |
| 6,686,879 B2 | 2/2004 | Shattil | |
| 6,725,017 B2 | 4/2004 | Blount et al. | |
| 6,907,093 B2 | 6/2005 | Blount et al. | |
| 6,915,112 B1 | 7/2005 | Sutton et al. | |
| 6,965,657 B1 | 11/2005 | Rezvani et al. | |
| 6,985,705 B2 | 1/2006 | Shohara | |
| 7,057,472 B2 | 6/2006 | Fukamachi et al. | |
| 7,110,381 B1 | 9/2006 | Osullivan et al. | |
| 7,139,543 B2 | 11/2006 | Shah | |
| 7,177,341 B2 | 2/2007 | McCorkle | |
| 7,228,104 B2 | 6/2007 | Collins et al. | |
| 7,266,358 B2 | 9/2007 | Hillstrom | |
| 7,302,024 B2 | 11/2007 | Arambepola | |
| 7,336,128 B2 | 2/2008 | Suzuki et al. | |
| 7,336,940 B2 | 2/2008 | Smithson | |
| 7,348,844 B2 | 3/2008 | Jaenecke | |
| 7,349,505 B2 | 3/2008 | Blount et al. | |
| 7,362,257 B2 | 4/2008 | Bruzzone et al. | |
| 7,372,420 B1 | 5/2008 | Osterhues et al. | |
| 7,397,843 B2 | 7/2008 | Grant et al. | |
| 7,426,242 B2 | 9/2008 | Thesling | |
| 7,508,898 B2 | 3/2009 | Cyr et al. | |
| 7,509,100 B2 | 3/2009 | Toncich | |
| 7,706,755 B2 | 4/2010 | Muhammad et al. | |
| 7,733,813 B2 | 6/2010 | Shin et al. | |
| 7,773,759 B2 | 8/2010 | Alves et al. | |
| 7,773,950 B2 | 8/2010 | Wang et al. | |
| 7,778,611 B2 | 8/2010 | Asai et al. | |
| 7,869,527 B2 | 1/2011 | Vetter et al. | |
| 7,948,878 B2 | 5/2011 | Briscoe et al. | |
| 7,962,170 B2 | 6/2011 | Axness et al. | |
| 7,987,363 B2 | 7/2011 | Chauncey et al. | |
| 7,999,715 B2 | 8/2011 | Yamaki et al. | |
| 8,005,235 B2 | 8/2011 | Rebandt et al. | |
| 8,023,438 B2 | 9/2011 | Kangasmaa et al. | |
| 8,027,642 B2 | 9/2011 | Proctor et al. | |
| 8,031,744 B2 | 10/2011 | Radunovic et al. | |
| 8,032,183 B2 | 10/2011 | Rudrapatna | |
| 8,036,606 B2 | 10/2011 | Kenington | |
| 8,055,235 B1 | 11/2011 | Gupta et al. | |
| 8,060,803 B2 | 11/2011 | Kim | |
| 8,081,695 B2 | 12/2011 | Chrabieh et al. | |
| 8,085,831 B2 | 12/2011 | Teague | |
| 8,086,191 B2 | 12/2011 | Fukuda et al. | |
| 8,090,320 B2 | 1/2012 | Dent et al. | |
| 8,155,046 B2 | 4/2012 | Jung et al. | |
| 8,155,595 B2 | 4/2012 | Sahin et al. | |
| 8,160,176 B2 | 4/2012 | Dent et al. | |
| 8,175,535 B2 | 5/2012 | Mu | |
| 8,179,990 B2 | 5/2012 | Orlik et al. | |
| 8,218,697 B2 | 7/2012 | Guess et al. | |
| 8,270,456 B2 | 9/2012 | Leach et al. | |
| 8,274,342 B2 | 9/2012 | Tsutsumi et al. | |
| 8,306,480 B2 | 11/2012 | Muhammad et al. | |
| 8,331,477 B2 | 12/2012 | Huang et al. | |
| 8,349,933 B2 | 1/2013 | Bhandari et al. | |
| 8,351,533 B2 | 1/2013 | Shrivastava et al. | |
| 8,385,855 B2 | 2/2013 | Lorg et al. | |
| 8,385,871 B2 | 2/2013 | Wyville | |
| 8,391,878 B2 | 3/2013 | Tenny | |
| 8,417,750 B2 | 4/2013 | Yan et al. | |
| 8,422,412 B2 | 4/2013 | Hahn | |
| 8,422,540 B1 | 4/2013 | Negus et al. | |
| 8,428,542 B2 | 4/2013 | Bornazyan | |
| 8,446,892 B2 | 5/2013 | Ji et al. | |
| 8,457,549 B2 | 6/2013 | Weng et al. | |
| 8,462,697 B2 | 6/2013 | Park et al. | |
| 8,467,757 B2 | 6/2013 | Ann | |
| 8,498,585 B2 | 7/2013 | Vandenameele | |
| 8,502,924 B2 | 8/2013 | Liou et al. | |
| 8,509,129 B2 | 8/2013 | Deb et al. | |
| 8,521,090 B2 | 8/2013 | Kim et al. | |
| 8,576,752 B2 | 11/2013 | Sarca | |
| 8,611,401 B2 | 12/2013 | Lakkis | |
| 8,619,916 B2 | 12/2013 | Jong | |
| 8,625,686 B2 | 1/2014 | Li et al. | |
| 8,626,090 B2 | 1/2014 | Dalipi | |
| 8,649,417 B2 | 2/2014 | Baldemair et al. | |
| 8,711,943 B2 | 4/2014 | Rossato et al. | |
| 8,743,674 B2 | 6/2014 | Parnaby et al. | |
| 8,744,377 B2 | 6/2014 | Rimini et al. | |
| 8,750,786 B2 | 6/2014 | Larsson et al. | |
| 8,755,756 B1 | 6/2014 | Zhang et al. | |
| 8,767,869 B2 | 7/2014 | Rimini et al. | |
| 8,787,907 B2 | 7/2014 | Jain et al. | |
| 8,798,177 B2 | 8/2014 | Park et al. | |
| 8,804,975 B2 | 8/2014 | Harris et al. | |
| 8,837,332 B2 | 9/2014 | Khojastepour et al. | |
| 8,842,584 B2 | 9/2014 | Jana et al. | |
| 8,879,433 B2 | 11/2014 | Khojastepour et al. | |
| 8,879,811 B2 | 11/2014 | Liu et al. | |
| 8,913,528 B2 | 12/2014 | Cheng et al. | |
| 8,929,550 B2 | 1/2015 | Shattil et al. | |
| 8,937,874 B2 | 1/2015 | Gainey et al. | |
| 8,942,314 B2 | 1/2015 | Aparin | |
| 8,958,769 B1 | 2/2015 | Razzell | |
| 8,995,410 B2 | 3/2015 | Balan et al. | |
| 8,995,932 B2 | 3/2015 | Wyville | |
| 9,014,069 B2 | 4/2015 | Patil et al. | |
| 9,019,849 B2 | 4/2015 | Hui et al. | |
| 9,031,567 B2 | 5/2015 | Haub | |
| 9,042,838 B2 | 5/2015 | Braithwaite | |
| 9,054,795 B2 | 6/2015 | Choi et al. | |
| 9,065,519 B2 | 6/2015 | Cyzs | |
| 9,077,421 B1 | 7/2015 | Mehlman et al. | |
| 9,112,476 B2 | 8/2015 | Basaran et al. | |
| 9,124,475 B2 | 9/2015 | Li et al. | |
| 9,130,747 B2 | 9/2015 | Zinser et al. | |
| 9,136,883 B1 | 9/2015 | Moher et al. | |
| 9,160,430 B2 | 10/2015 | Maltsev et al. | |
| 9,184,902 B2 | 11/2015 | Khojastepour et al. | |
| 9,185,711 B2 | 11/2015 | Lin et al. | |
| 9,231,647 B2 | 1/2016 | Polydoros et al. | |
| 9,231,712 B2 | 1/2016 | Hahn et al. | |
| 9,236,996 B2 | 1/2016 | Khandani | |
| 9,264,024 B2 | 2/2016 | Shin et al. | |
| 9,312,895 B1 | 4/2016 | Gupta et al. | |
| 9,325,432 B2 | 4/2016 | Hong et al. | |
| 9,331,737 B2 | 5/2016 | Hong et al. | |
| 9,413,500 B2 | 8/2016 | Chincholi et al. | |
| 9,413,516 B2 | 8/2016 | Khandani | |

(56) References Cited

U.S. PATENT DOCUMENTS

| | | |
|---|---|---|
| 9,455,756 B2 | 9/2016 | Choi et al. |
| 9,461,698 B2 | 10/2016 | Moffatt et al. |
| 9,479,198 B2 | 10/2016 | Moher et al. |
| 9,490,918 B2 | 11/2016 | Negus et al. |
| 9,490,963 B2 | 11/2016 | Choi et al. |
| 9,537,543 B2 | 1/2017 | Choi |
| 9,559,734 B2 | 1/2017 | Hwang et al. |
| 9,621,221 B2 | 4/2017 | Hua et al. |
| 9,742,593 B2 | 8/2017 | Moorti et al. |
| 10,491,313 B2 * | 11/2019 | Jain .............. H04B 1/525 |
| 2002/0034191 A1 | 3/2002 | Shattil |
| 2002/0064245 A1 | 5/2002 | McCorkle |
| 2002/0072344 A1 | 6/2002 | Souissi |
| 2002/0109631 A1 | 8/2002 | Li et al. |
| 2002/0154717 A1 | 10/2002 | Shima et al. |
| 2002/0172265 A1 | 11/2002 | Kenney |
| 2003/0031279 A1 | 2/2003 | Blount et al. |
| 2003/0099287 A1 | 5/2003 | Arambepola |
| 2003/0104787 A1 | 6/2003 | Blount et al. |
| 2003/0148748 A1 | 8/2003 | Shah |
| 2004/0106381 A1 | 6/2004 | Tiller |
| 2004/0171351 A1 | 9/2004 | Nakazawa et al. |
| 2004/0266378 A1 | 12/2004 | Fukamachi et al. |
| 2005/0030888 A1 | 2/2005 | Thesling |
| 2005/0078743 A1 | 4/2005 | Shohara |
| 2005/0101267 A1 | 5/2005 | Smithson |
| 2005/0129152 A1 | 6/2005 | Hillstrom |
| 2005/0159128 A1 | 7/2005 | Collins et al. |
| 2005/0190870 A1 | 9/2005 | Blount et al. |
| 2005/0250466 A1 | 11/2005 | Varma et al. |
| 2005/0254555 A1 | 11/2005 | Teague |
| 2005/0282500 A1 | 12/2005 | Wang et al. |
| 2006/0029124 A1 | 2/2006 | Grant et al. |
| 2006/0030277 A1 | 2/2006 | Cyr et al. |
| 2006/0058022 A1 | 3/2006 | Webster et al. |
| 2006/0083297 A1 | 4/2006 | Yan et al. |
| 2006/0209754 A1 | 9/2006 | Ji et al. |
| 2006/0240769 A1 | 10/2006 | Proctor et al. |
| 2006/0273853 A1 | 12/2006 | Suzuki et al. |
| 2007/0018722 A1 | 1/2007 | Jaenecke |
| 2007/0105509 A1 | 5/2007 | Muhammad et al. |
| 2007/0207747 A1 | 9/2007 | Johnson et al. |
| 2007/0207748 A1 | 9/2007 | Toncich |
| 2007/0219739 A1 * | 9/2007 | Spears .............. G01R 31/2822 702/85 |
| 2007/0249314 A1 | 10/2007 | Sanders et al. |
| 2007/0274372 A1 | 11/2007 | Asai et al. |
| 2007/0283220 A1 | 12/2007 | Kim |
| 2007/0296625 A1 | 12/2007 | Bruzzone et al. |
| 2008/0037801 A1 | 2/2008 | Alves et al. |
| 2008/0089397 A1 | 4/2008 | Vetter et al. |
| 2008/0107046 A1 | 5/2008 | Kangasmaa et al. |
| 2008/0111754 A1 | 5/2008 | Osterhues et al. |
| 2008/0131133 A1 | 6/2008 | Blunt et al. |
| 2008/0144852 A1 | 6/2008 | Rebandt et al. |
| 2008/0192636 A1 | 8/2008 | Briscoe et al. |
| 2008/0219339 A1 | 9/2008 | Chrabieh et al. |
| 2008/0219377 A1 | 9/2008 | Nisbet |
| 2008/0279122 A1 | 11/2008 | Fukuda et al. |
| 2009/0022089 A1 | 1/2009 | Rudrapatna |
| 2009/0034437 A1 | 2/2009 | Shin et al. |
| 2009/0047914 A1 | 2/2009 | Axness et al. |
| 2009/0115912 A1 | 5/2009 | Liou et al. |
| 2009/0180404 A1 | 7/2009 | Jung et al. |
| 2009/0186582 A1 | 7/2009 | Muhammad et al. |
| 2009/0213770 A1 | 8/2009 | Mu |
| 2009/0221231 A1 | 9/2009 | Murch et al. |
| 2009/0262852 A1 | 10/2009 | Orlik et al. |
| 2009/0303908 A1 | 12/2009 | Deb et al. |
| 2010/0014600 A1 | 1/2010 | Li et al. |
| 2010/0014614 A1 | 1/2010 | Leach et al. |
| 2010/0022201 A1 | 1/2010 | Vandenameele |
| 2010/0031036 A1 | 2/2010 | Chauncey et al. |
| 2010/0056166 A1 | 3/2010 | Tenny |
| 2010/0081408 A1 * | 4/2010 | Mu .............. H03D 7/1441 455/326 |
| 2010/0103900 A1 | 4/2010 | Ann et al. |
| 2010/0117693 A1 | 5/2010 | Buer et al. |
| 2010/0120390 A1 * | 5/2010 | Panikkath .............. G01R 13/02 455/208 |
| 2010/0136900 A1 | 6/2010 | Seki |
| 2010/0150032 A1 | 6/2010 | Zinser et al. |
| 2010/0150033 A1 | 6/2010 | Zinser et al. |
| 2010/0150070 A1 | 6/2010 | Chae et al. |
| 2010/0159858 A1 | 6/2010 | Dent et al. |
| 2010/0197231 A1 | 8/2010 | Kenington |
| 2010/0208854 A1 | 8/2010 | Guess et al. |
| 2010/0215124 A1 | 8/2010 | Zeong et al. |
| 2010/0226356 A1 | 9/2010 | Sahin et al. |
| 2010/0226416 A1 | 9/2010 | Dent et al. |
| 2010/0226448 A1 | 9/2010 | Dent |
| 2010/0232324 A1 | 9/2010 | Radunovic et al. |
| 2010/0266057 A1 | 10/2010 | Shrivastava et al. |
| 2010/0272289 A1 | 10/2010 | Kornagel et al. |
| 2010/0277289 A1 | 11/2010 | Brauner et al. |
| 2010/0278085 A1 | 11/2010 | Hahn |
| 2010/0279602 A1 | 11/2010 | Larsson et al. |
| 2010/0284447 A1 | 11/2010 | Gore et al. |
| 2010/0295716 A1 | 11/2010 | Yamaki et al. |
| 2011/0013684 A1 | 1/2011 | Semenov et al. |
| 2011/0013735 A1 | 1/2011 | Huang et al. |
| 2011/0026509 A1 | 2/2011 | Tanaka |
| 2011/0081880 A1 | 4/2011 | Ann |
| 2011/0149714 A1 | 6/2011 | Rimini et al. |
| 2011/0171922 A1 | 7/2011 | Kim et al. |
| 2011/0216813 A1 | 9/2011 | Baldemair et al. |
| 2011/0222631 A1 | 9/2011 | Jong |
| 2011/0227664 A1 | 9/2011 | Wyville |
| 2011/0243202 A1 | 10/2011 | Lakkis |
| 2011/0250858 A1 | 10/2011 | Jain et al. |
| 2011/0254639 A1 | 10/2011 | Tsutsumi et al. |
| 2011/0256857 A1 | 10/2011 | Chen et al. |
| 2011/0268232 A1 | 11/2011 | Park et al. |
| 2011/0311067 A1 | 12/2011 | Harris et al. |
| 2011/0319044 A1 | 12/2011 | Bornazyan |
| 2012/0007651 A1 * | 1/2012 | Meng .............. H03K 23/50 327/356 |
| 2012/0021153 A1 | 1/2012 | Bhandari et al. |
| 2012/0052892 A1 | 3/2012 | Braithwaite |
| 2012/0063369 A1 | 3/2012 | Lin et al. |
| 2012/0063373 A1 | 3/2012 | Chincholi et al. |
| 2012/0140685 A1 | 6/2012 | Lederer et al. |
| 2012/0140860 A1 | 6/2012 | Rimini et al. |
| 2012/0147790 A1 | 6/2012 | Khojastepour et al. |
| 2012/0154249 A1 | 6/2012 | Khojastepour et al. |
| 2012/0155335 A1 | 6/2012 | Khojastepour et al. |
| 2012/0155336 A1 | 6/2012 | Khojastepour et al. |
| 2012/0201153 A1 | 8/2012 | Bharadia et al. |
| 2012/0201173 A1 | 8/2012 | Jain et al. |
| 2012/0224497 A1 | 9/2012 | Lindoff et al. |
| 2013/0005284 A1 | 1/2013 | Dalipi |
| 2013/0040555 A1 | 2/2013 | Rimini et al. |
| 2013/0044791 A1 | 2/2013 | Rimini et al. |
| 2013/0077502 A1 | 3/2013 | Gainey et al. |
| 2013/0089009 A1 | 4/2013 | Li et al. |
| 2013/0102254 A1 | 4/2013 | Cyzs et al. |
| 2013/0114468 A1 | 5/2013 | Hui et al. |
| 2013/0120190 A1 | 5/2013 | McCune |
| 2013/0142030 A1 | 6/2013 | Parnaby et al. |
| 2013/0155913 A1 | 6/2013 | Sarca |
| 2013/0166259 A1 | 6/2013 | Weber et al. |
| 2013/0194984 A1 | 8/2013 | Cheng et al. |
| 2013/0215805 A1 | 8/2013 | Hong et al. |
| 2013/0225101 A1 | 8/2013 | Basaran et al. |
| 2013/0253917 A1 | 9/2013 | Schildbach |
| 2013/0259343 A1 | 10/2013 | Liu et al. |
| 2013/0286903 A1 | 10/2013 | Khojastepour et al. |
| 2013/0294523 A1 | 11/2013 | Rossato et al. |
| 2013/0301487 A1 | 11/2013 | Khandani |
| 2013/0301488 A1 | 11/2013 | Hong et al. |
| 2013/0308717 A1 | 11/2013 | Maltsev et al. |
| 2013/0315211 A1 | 11/2013 | Balan et al. |
| 2014/0011461 A1 | 1/2014 | Bakalski et al. |

(56) References Cited

U.S. PATENT DOCUMENTS

| | | |
|---|---|---|
| 2014/0016515 A1 | 1/2014 | Jana |
| 2014/0036736 A1 | 2/2014 | Wyville |
| 2014/0072072 A1 | 3/2014 | Ismail et al. |
| 2014/0126437 A1 | 5/2014 | Patil et al. |
| 2014/0140250 A1 | 5/2014 | Kim et al. |
| 2014/0169236 A1 | 6/2014 | Choi et al. |
| 2014/0185533 A1 | 7/2014 | Haub |
| 2014/0194073 A1 | 7/2014 | Wyville et al. |
| 2014/0206300 A1 | 7/2014 | Hahn et al. |
| 2014/0219139 A1 | 8/2014 | Choi et al. |
| 2014/0219449 A1 | 8/2014 | Shattil et al. |
| 2014/0232468 A1* | 8/2014 | Hulbert ............... H04B 1/0475 330/293 |
| 2014/0235191 A1* | 8/2014 | Mikhemar ............ H04B 1/109 455/295 |
| 2014/0269991 A1 | 9/2014 | Aparin |
| 2014/0313946 A1 | 10/2014 | Azadet |
| 2014/0348018 A1 | 11/2014 | Bharadia et al. |
| 2014/0348032 A1 | 11/2014 | Hua et al. |
| 2014/0349595 A1 | 11/2014 | Cox |
| 2014/0349716 A1* | 11/2014 | Axholt ................ H04B 1/0475 455/571 |
| 2014/0376416 A1 | 12/2014 | Choi |
| 2015/0049834 A1 | 2/2015 | Choi et al. |
| 2015/0094008 A1 | 4/2015 | Maxim et al. |
| 2015/0103745 A1 | 4/2015 | Negus et al. |
| 2015/0139122 A1 | 5/2015 | Rimini et al. |
| 2015/0146765 A1 | 5/2015 | Moffatt et al. |
| 2015/0156003 A1 | 6/2015 | Khandani |
| 2015/0156004 A1 | 6/2015 | Khandani |
| 2015/0171903 A1 | 6/2015 | Mehlman et al. |
| 2015/0180522 A1 | 6/2015 | Wyville |
| 2015/0188646 A1 | 7/2015 | Bharadia et al. |
| 2015/0215937 A1 | 7/2015 | Khandani |
| 2015/0249444 A1 | 9/2015 | Shin et al. |
| 2015/0256210 A1 | 9/2015 | Nilsson |
| 2015/0270865 A1 | 9/2015 | Polydoros et al. |
| 2015/0280893 A1 | 10/2015 | Choi et al. |
| 2015/0303984 A1 | 10/2015 | Braithwaite |
| 2015/0311928 A1 | 10/2015 | Chen et al. |
| 2015/0333847 A1 | 11/2015 | Bharadia et al. |
| 2016/0043759 A1 | 2/2016 | Choi et al. |
| 2016/0056846 A1 | 2/2016 | Moher et al. |
| 2016/0105213 A1 | 4/2016 | Hua et al. |
| 2016/0119019 A1 | 4/2016 | Pratt |
| 2016/0119020 A1 | 4/2016 | Charlon |
| 2016/0127113 A1* | 5/2016 | Khandani ............. H04L 5/1423 370/278 |
| 2016/0182097 A1 | 6/2016 | Jiang et al. |
| 2016/0218769 A1 | 7/2016 | Chang et al. |
| 2016/0226653 A1 | 8/2016 | Bharadia et al. |
| 2016/0266245 A1 | 9/2016 | Bharadia et al. |
| 2016/0269061 A1 | 9/2016 | Hwang et al. |
| 2016/0285484 A1* | 9/2016 | Weissman ........... H04B 1/0475 |
| 2016/0285486 A1* | 9/2016 | Qin ...................... H04B 1/1027 |
| 2016/0294425 A1* | 10/2016 | Hwang ................. H04B 1/525 |
| 2016/0315754 A1 | 10/2016 | Wu et al. |
| 2016/0344432 A1 | 11/2016 | Hwang et al. |
| 2016/0380706 A1 | 12/2016 | Tanzi et al. |
| 2017/0005773 A1* | 1/2017 | Liu ....................... H04B 1/525 |
| 2017/0041095 A1 | 2/2017 | Hwang et al. |
| 2017/0170948 A1 | 6/2017 | Eltawil et al. |
| 2017/0187513 A9 | 6/2017 | Bharadia et al. |
| 2017/0366138 A1* | 12/2017 | Mu ...................... H03D 7/1441 |
| 2018/0063745 A1 | 3/2018 | Jain et al. |
| 2018/0227925 A1 | 8/2018 | Gebhard |
| 2019/0158193 A1* | 5/2019 | Jain ...................... H04B 15/02 |
| 2019/0204413 A1* | 7/2019 | Jaeger .................. G01S 7/35 |
| 2019/0372533 A1* | 12/2019 | Huang .................. H04B 1/16 |

FOREIGN PATENT DOCUMENTS

| | | |
|---|---|---|
| EP | 2237434 A1 | 10/2010 |
| EP | 2267946 A2 | 12/2010 |
| RU | 2256985 C2 | 7/2005 |
| WO | 2013173250 A1 | 11/2013 |
| WO | 2013185106 A1 | 12/2013 |
| WO | 2014093916 A1 | 6/2014 |

OTHER PUBLICATIONS

Bharadia et al., "Full Duplex Radios" SIGOMM, Aug. 12-16 2013, Hong Kong, China, Copyright 2013 ACM 978-1-4503-2056-6/6/13/08, 12 pages.

International Search Report and Written Opinion for International Application No. PCT/US18/24577.

McMichael et al., "Optimal Tuning of Analog Self-Interference Cancellers for Full-Duple Wireless Communication", Oct. 1-5, 2012, Fiftieth Annual Allerton Conference, Illinois, USA, pp. 246-251.

\* cited by examiner

PRIOR ART

SYSTEMS AND METHODS FOR LINEARIZED-MIXER OUT-OF-BAND INTERFERENCE MITIGATION

CROSS REFERENCE TO RELATED APPLICATIONS

This application is a continuation-in-part of U.S. patent application Ser. No. 16/262,045, filed 30 Jan. 2019, which is a continuation of U.S. patent application Ser. No. 15/706,547, filed 15 Sep. 2017, which is a continuation of U.S. patent application Ser. No. 15/378,180, filed on 14 Dec. 2016, which claims the benefit of U.S. Provisional Application Ser. No. 62/268,400, filed on 16 Dec. 2015, all of which are incorporated in their entireties by this reference.

TECHNICAL FIELD

This invention relates generally to the wireless communications field, and more specifically to new and useful systems and methods for out-of-band interference mitigation.

BACKGROUND

Traditional wireless communication systems are half-duplex; that is, they are not capable of transmitting and receiving signals simultaneously on a single wireless communications channel. One way that this issue is addressed is through the use of frequency division multiplexing (FDM), in which transmission and reception occur on different frequency channels. Unfortunately, the performance of FDM-based communication is limited by the issue of adjacent-channel interference (ACI), which occurs when a transmission on a first frequency channel contains non-negligible strength in another frequency channel used by a receiver. ACI may be addressed by increasing channel separation, but this in turn limits the bandwidth available for use in a given area. ACI may also be addressed by filtering, but the use of filters alone may result in inadequate performance for many applications. Thus, there is a need in the wireless communications field to create new and useful systems and methods for out-of-band interference mitigation. This invention provides such new and useful systems and methods.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Out-of-Band Interference Mitigation Systems

A system 1000 for out-of-band interference mitigation includes a receive band interference cancellation system (RxICS) 1300 and at least one of a transmit band interference cancellation system (TxICS) 1100 and a transmit band interference filtering system (TxIFS) 1200. The system 1000 may additionally or alternatively include a receive band filtering system (RxIFS) 1400. The system 1000 may additionally include any number of additional elements to enable interference cancellation and/or filtering, including signal couplers 1010, amplifiers 1020, frequency upconverters 1030, frequency downconverters 1040, analog-to-digital converters (ADC) 1050, digital-to-analog converters (DAC) 1060, time delays 1070, and any other circuit components (e.g., phase shifters, attenuators, transformers, filters, etc.).

The system 1000 is preferably implemented using digital and/or analog circuitry. Digital circuitry is preferably implemented using a general-purpose processor, a digital signal processor, an application specific integrated circuit (ASIC), a field programmable gate array (FPGA) and/or any suitable processor(s) or circuit(s). Analog circuitry is preferably implemented using analog integrated circuits (ICs) but may additionally or alternatively be implemented using discrete components (e.g., capacitors, resistors, transistors), wires, transmission lines, waveguides, digital components, mixed-signal components, or any other suitable components. The system 1000 preferably includes memory to store configuration data, but may additionally or alternatively be configured using externally stored configuration data or in any suitable manner.

The system 1000 functions to reduce interference present in a communications receiver resulting from transmission of a nearby transmitter on an adjacent communications channel (e.g., adjacent-channel interference). Adjacent-channel interference may result from either or both of a receiver receiving transmissions outside of a desired receive channel and a transmitter transmitting (either intentionally or via leakage) on the desired receive channel.

Figure 1:
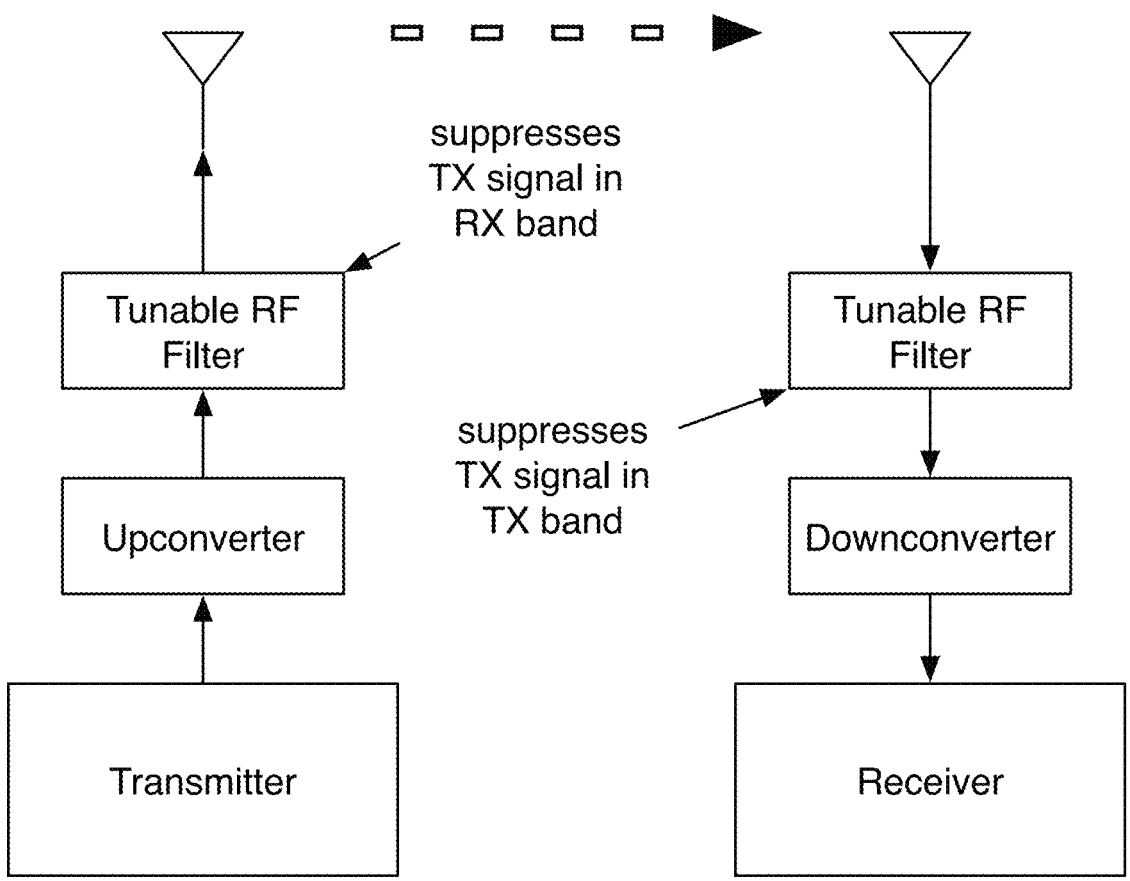
FIG. 1 is a prior art representation of out-of-band interference mitigation.

Traditionally, adjacent-channel interference has been mitigated using tunable or selectable filter-based architectures; for example, as shown in FIG. 1. On the transmit side, the tunable radio frequency (RF) filter is used to suppress the transmit signal in the receive band (e.g., a bandpass filter that only lets the transmit band pass). On the receive side, the tunable RF filter is generally used to suppress interference due to the transmitted signal in the transmit band (e.g., a bandpass filter that only lets the receive band pass). In some cases, this filter may also be used to selectively filter signal in the receive band as well.

This purely filter-based approach is limited primarily by its ability to remove interference in the receive band. Filtering in the receive band primarily occurs at the transmit side. Since, frequently, out-of-channel signal results from non-linear processes such as amplification, this filtering must generally occur at RF and after power amplification, which means that the transmit filter must both be able to reject a large amount of signal out-of-band without a large insertion loss. In other words, in these cases the filter must generally have a high quality factor (Q factor, Q), high insertion loss, or low interference rejection ability.

Likewise, the RF filter on the receive side must also be able to reject a large amount of signal out-of-band (since the transmit side filter does not filter the transmit band signal), and so it must also have high Q, high insertion loss, or low interference rejection ability. Note that these limitations are especially apparent in cases where the transmit and receive antennas are nearby (i.e., antenna isolation is low), because the amount of power that must be rejected by the RF filters increases; or when channel separation is small (and therefore filter Q must be higher).

The system 1000 provides improved interference mitigation by performing interference cancellation either as a substitute for or in addition to interference filtering. The system 1000 uses a receive band interference cancellation system (RxICS 1300) to remove interference in the receive band, as well as either or both of the transmit band interference cancellation system (TxICS 1100) and transmit band interference filtering system (TxIFS 1200) to remove interference in the transmit band.

The system 1000 may be arranged in various architectures including these elements, enabling flexibility for a number of applications. In some embodiments, the system 1000 may be attached or coupled to existing transceivers; additionally or alternatively, the system 1000 may be integrated into transceivers. Examples of architectures of the system 1000 are as shown in FIGS. 2-7.

Figure 2:
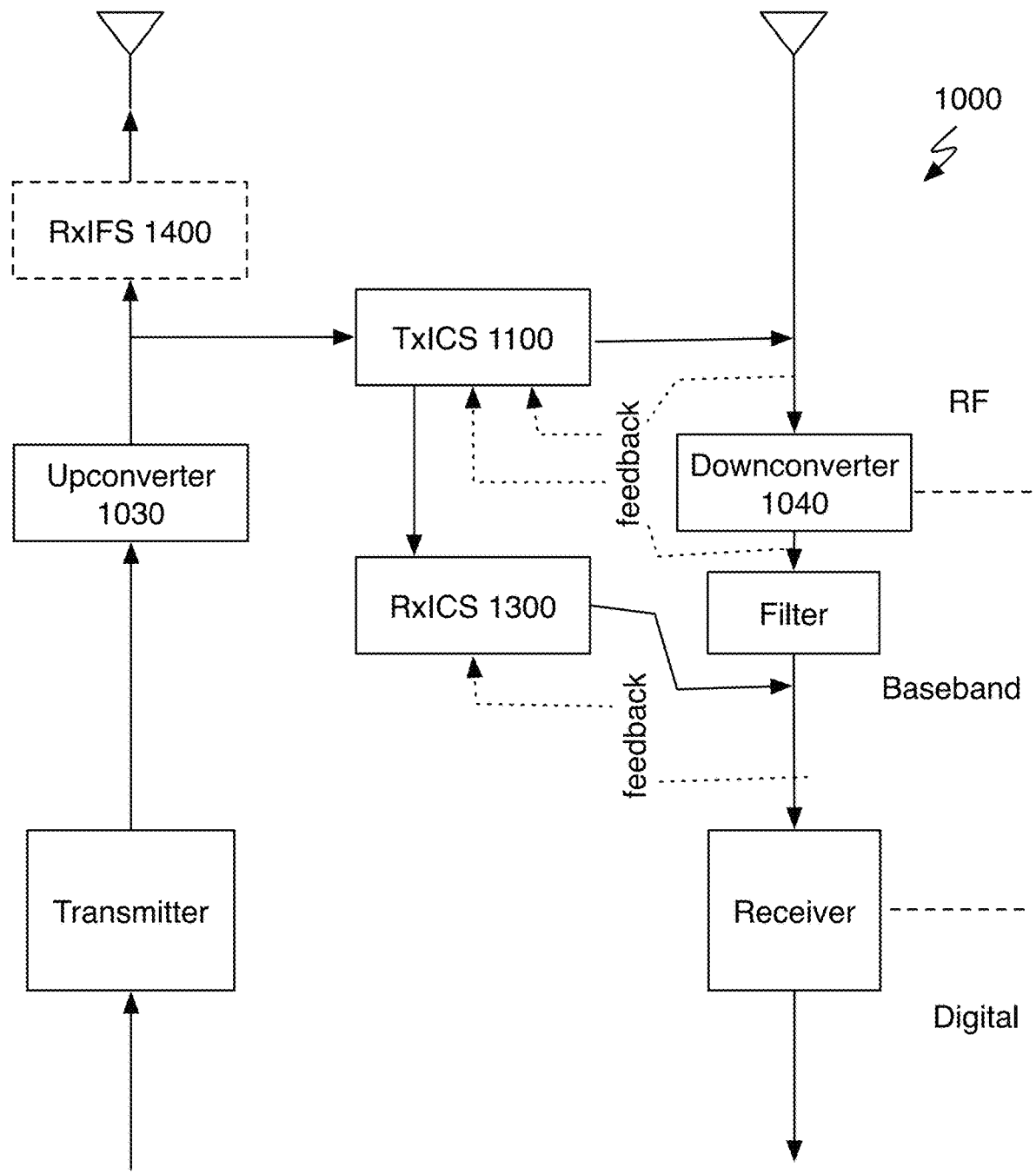
FIG. 2 is a diagram representation of a system of a preferred embodiment.

As shown in FIG. 2, the system 1000 may mitigate interference using the TxICS 1100 and RxICS 1300 (as well as optionally the RxIFS 1400), combining the RxICS 1300 interference cancellation with a baseband receive signal.

Figure 3:
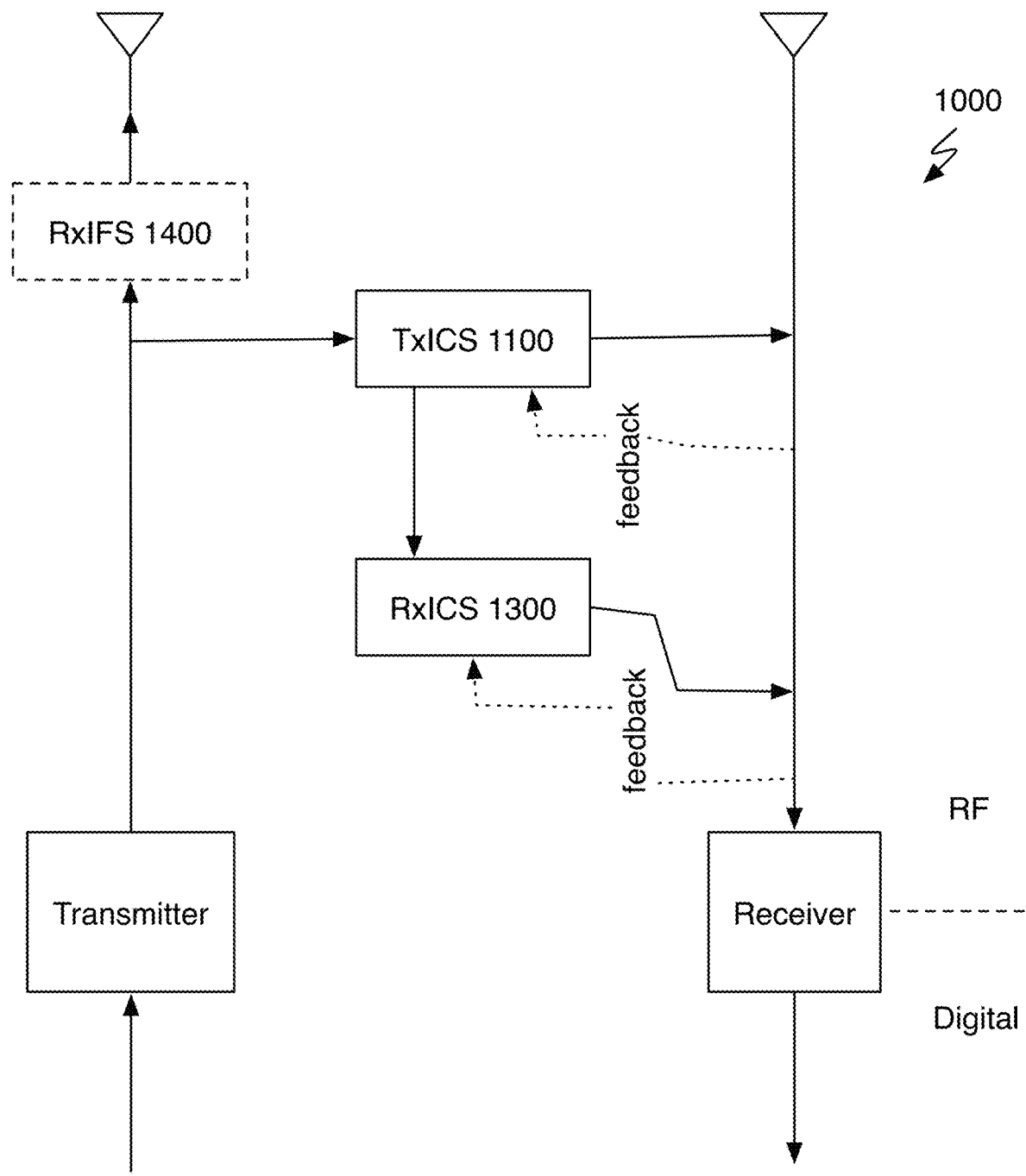
FIG. 3 is a diagram representation of a system of a preferred embodiment.

As shown in FIG. 3, the system 1000 may mitigate interference using the TxICS 1100 and RxICS 1300 (as well as optionally the RxIFS 1400), combining the RxICS 1300 interference cancellation with an RF receive signal.

Figure 4:
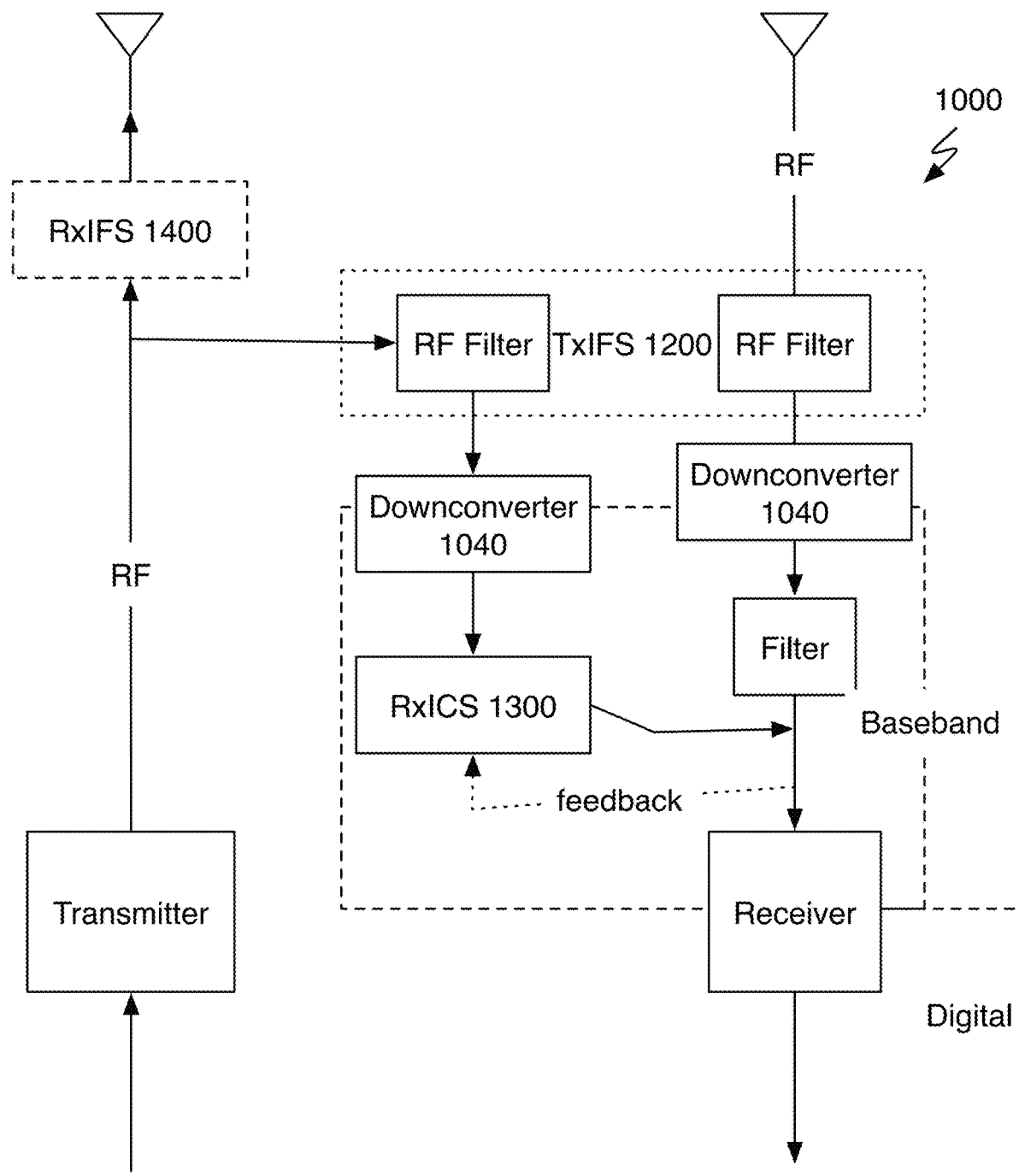
FIG. 4 is a diagram representation of a system of a preferred embodiment.

As shown in FIG. 4, the system 1000 may mitigate interference using the TxIFS 1200 and RxICS 1300 (as well as optionally the RxIFS 1400), combining the RxICS 1300 interference cancellation with a baseband receive signal.

Figure 5:
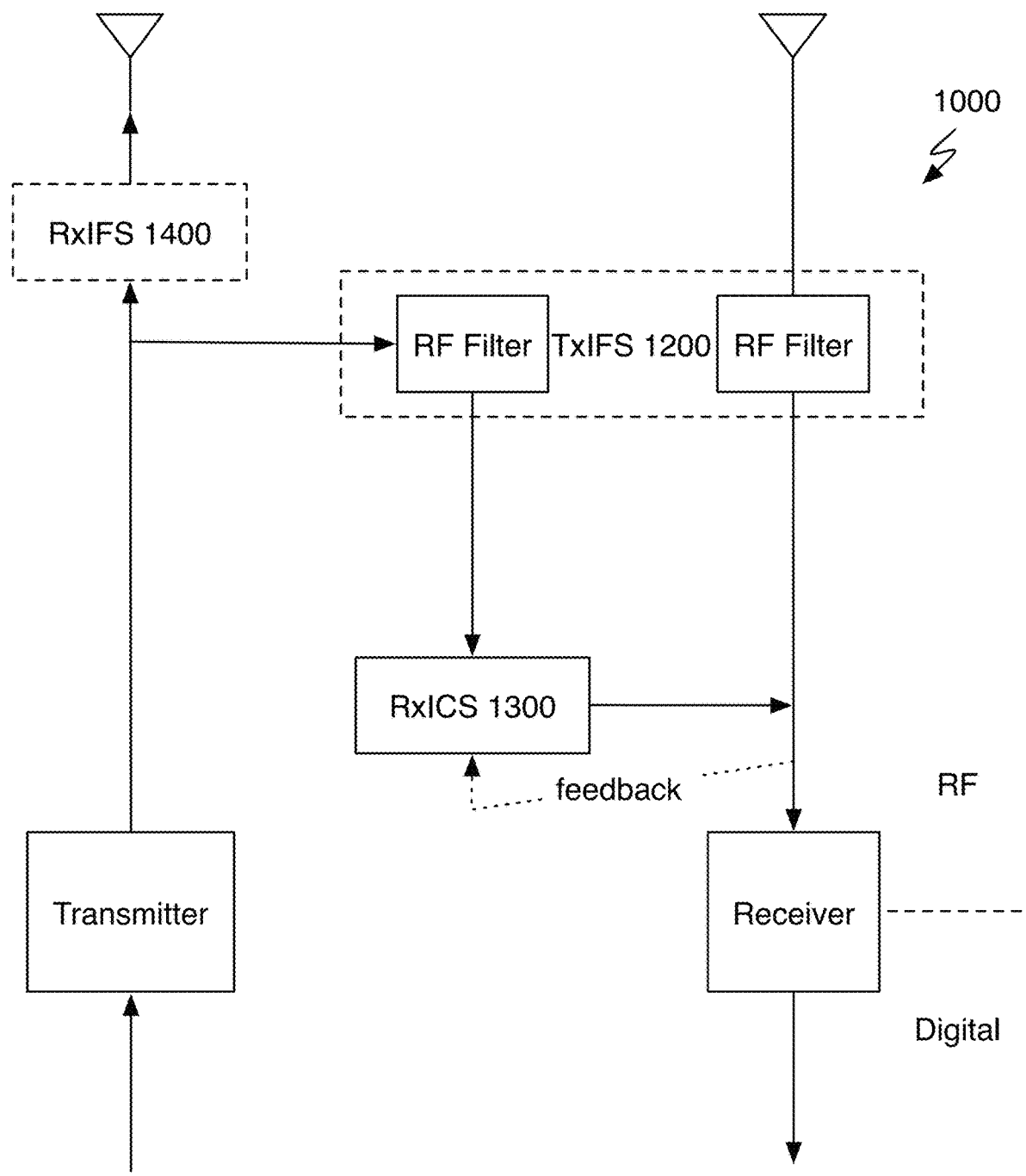
FIG. 5 is a diagram representation of a system of a preferred embodiment.

As shown in FIG. 5, the system 1000 may mitigate interference using the TxIFS 1200 and RxICS 1300 (as well as optionally the RxIFS 1400), combining the RxICS 1300 interference cancellation with an RF receive signal.

Figure 6:
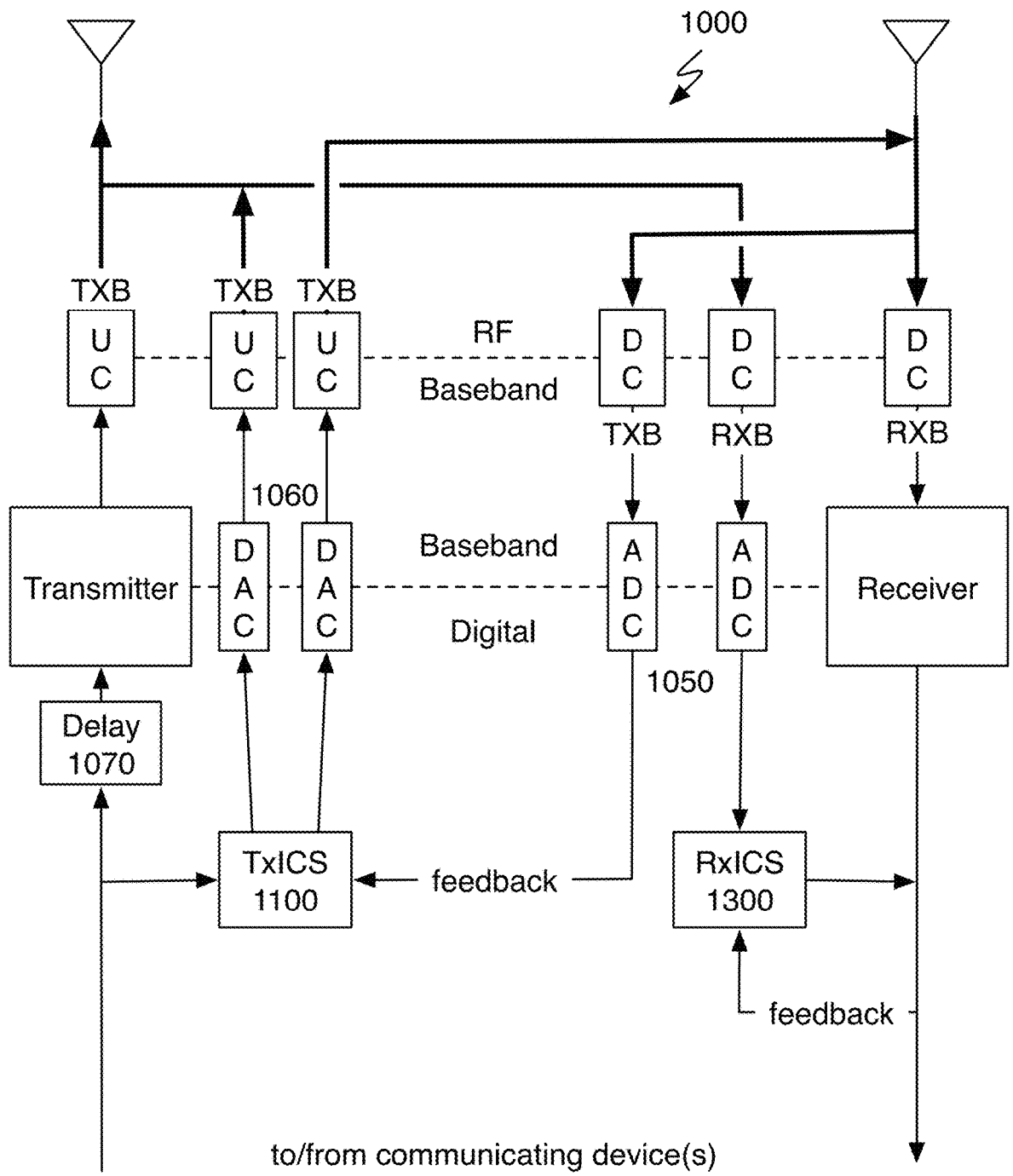
FIG. 6 is a diagram representation of a system of a preferred embodiment.

As shown in FIG. 6, the system 1000 may mitigate interference using the TxICS 1100 and RxICS 1300, combining the RxICS 1300 interference cancellation with a digital receive signal.

Figure 7:
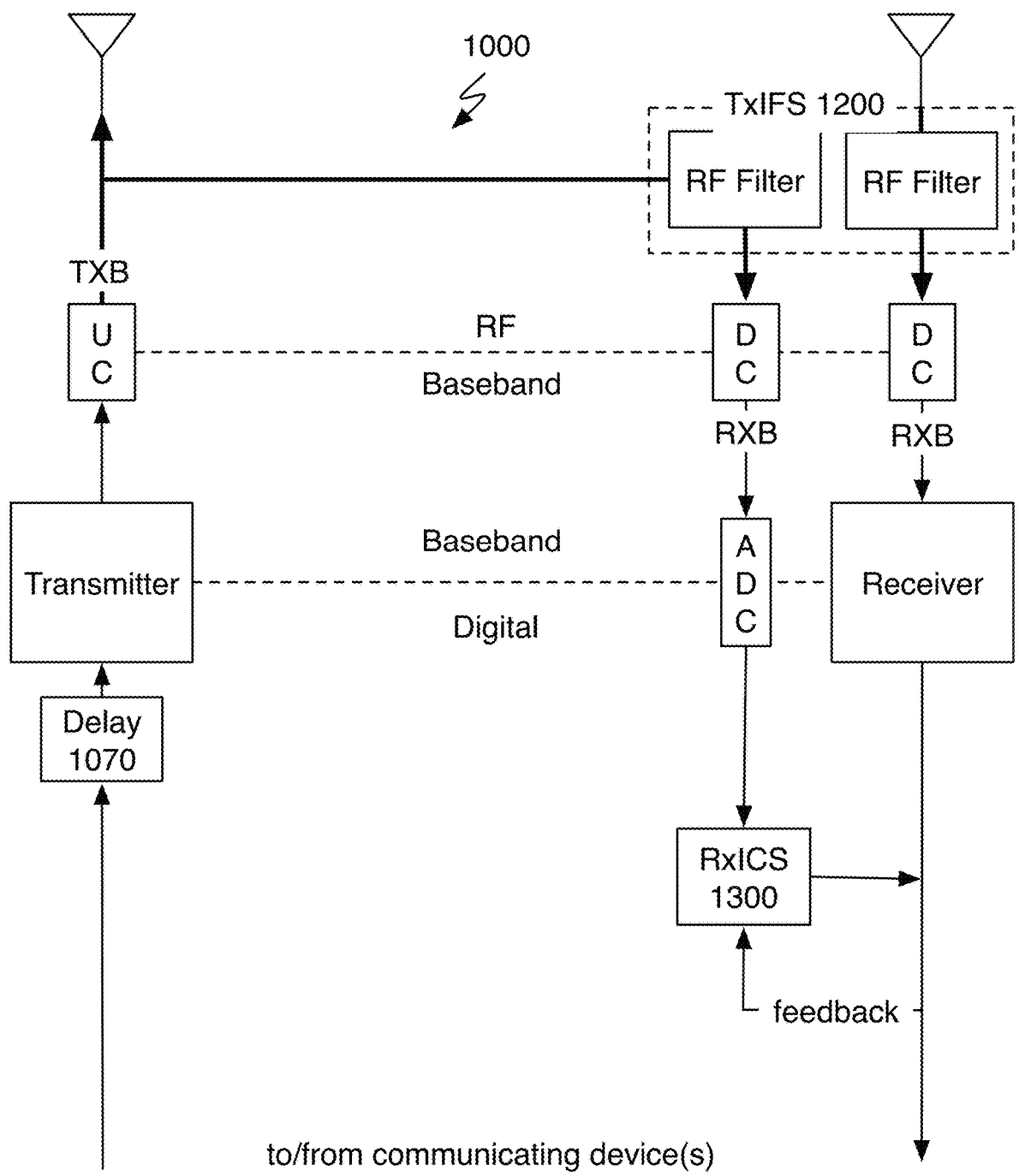
FIG. 7 is a diagram representation of a system of a preferred embodiment.

As shown in FIG. 7, the system 1000 may mitigate interference using the TxIFS 1200 and RxICS 1300, combining the RxICS 1300 interference cancellation with a digital receive signal.

Figure 8:
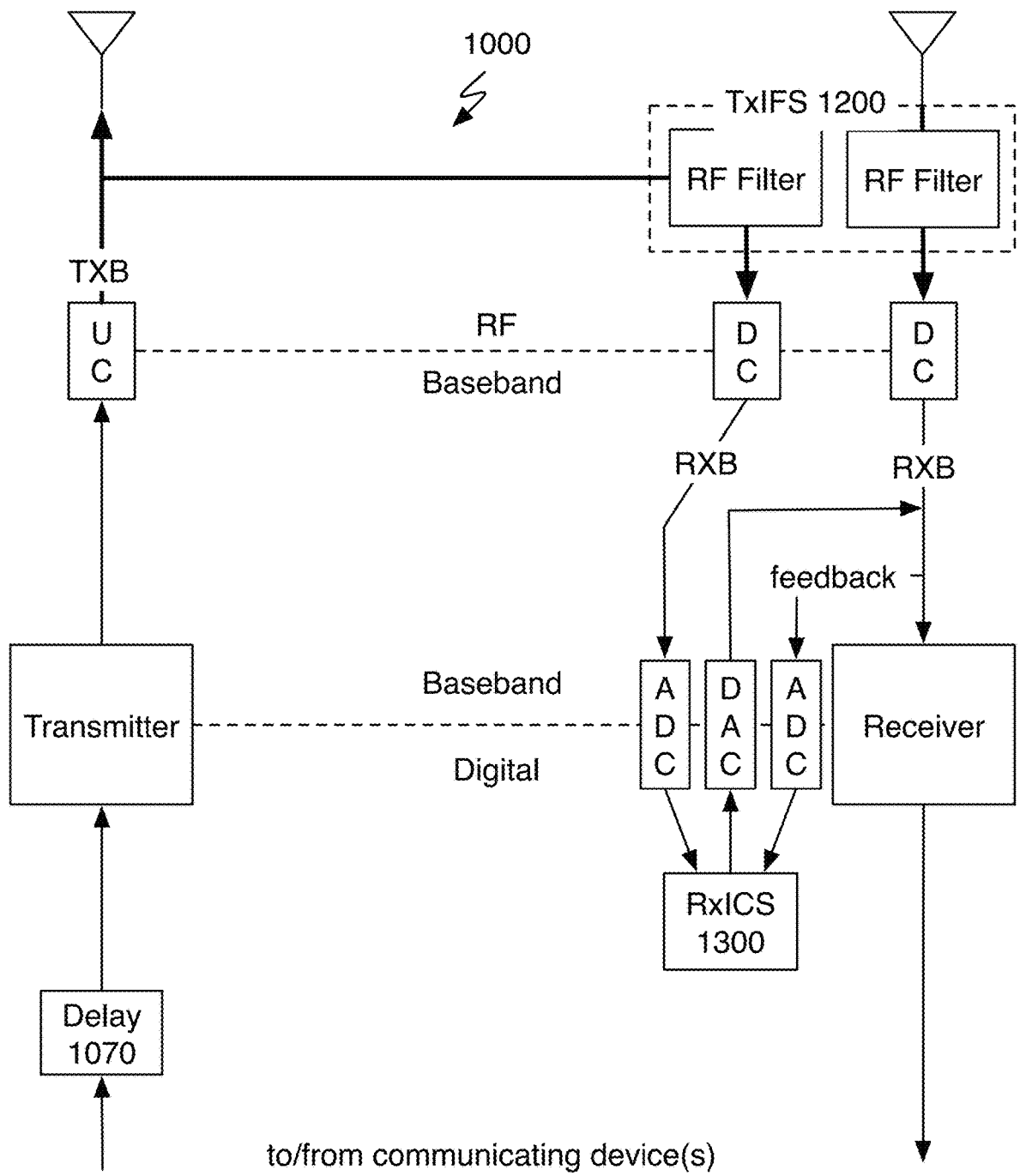
FIG. 8 is a diagram representation of a system of a preferred embodiment.

As shown in FIG. 8, the system 1000 may mitigate interference using the TxIFS 1200 and RxICS 1300, combining the RxICS 1300 interference cancellation with an analog receive signal.

In one implementation of a preferred embodiment, the RxICS 1300 can include a switchable output, enabling combination of the RxICS 1300 interference cancellation with a digital receive signal, an analog receive signal, and/or an RF receive signal. The RxICS 1300 may include an RxDC 1310 with an output switchable between a digital output, a baseband analog output (after digital-to-analog conversion), and an IF/RF analog output (after frequency upconversion of the analog output). Additionally or alternatively, the RxICS 1300 may include an RxAC 1320 with an output switchable between an RF output, a baseband/IF analog output (after frequency downconversion of the RF output), and a digital output (after analog-to-digital conversion of the analog output). Selection of which interference cancellation output to combine with the appropriate receive signal is preferably performed by a tuning circuit, but can additionally or alternatively be performed by any suitable controller. In this implementation, the tuning circuit preferably receives feedback signals from the receive path at the RF, baseband, and digital signal paths, and the output is selected (e.g., by the tuning circuit) according to changes in the feedback signal that are indicative of optimal interference-cancellation performance. Similarly, the TxICS 1100 can include a switchable output as described above, but directed to performing interference cancellation in the transmit band in lieu of the receive band.

The system 1000 is preferably coupled to or integrated with a receiver that functions to receive analog receive signals transmitted over a communications link (e.g., a wireless channel, a coaxial cable). The receiver preferably converts analog receive signals into digital receive signals for processing by a communications system, but may additionally or alternatively not convert analog receive signals (passing them through directly without conversion).

The receiver is preferably coupled to the communications link by a duplexer-coupled RF antenna, but may additionally or alternatively be coupled to the communications link in any suitable manner. Some examples of alternative couplings include coupling via one or more dedicated receive antennas. In another alternative coupling, the receiver may be coupled to the communications link by a circulator-coupled RF antenna.

The receiver preferably includes an ADC 1050 (described in following sections) and converts baseband analog signals to digital signals. The receiver may additionally or alternatively include an integrated amplifier 1020 and/or a frequency downconverter 1040 (enabling the receiver to convert RF or other analog signals to digital).

The system 1000 is preferably coupled to or integrated with a transmitter that functions to transmit signals of the communications system over a communications link to a second communications system. The transmitter preferably converts digital transmit signals into analog transmit signals.

The transmitter is preferably coupled to the communications link by a duplexer-coupled RF antenna, but may additionally or alternatively be coupled to the communications link in any suitable manner. Some examples of alternative couplings include coupling via one or more dedicated transmit antennas, dual-purpose transmit and/or receive antennas, or any other suitable antennas. In other alternative couplings, the transmitter may be coupled to the communications link by direct wired coupling (e.g., through one or more RF coaxial cables, transmission line couplers, etc.).

The transmitter preferably includes a DAC 1060 (described in following sections) and converts digital signals to baseband analog signals. The transmitter may additionally or alternatively include an integrated amplifier 1020 and/or a frequency upconverter 1030 (enabling the transmitter to convert digital signals to RF signals and/or intermediate frequency (IF) signals).

The transmitter and receiver may be coupled to the same communicating device or different communicating devices. In some variations, there may be multiple transmitters and/or receivers, which may be coupled to the same or different communication devices in any suitable combination.

Signal couplers 1010 function to allow analog signals to be split and/or combined. While not necessarily shown in the figures, signal couplers are preferably used at each junction (e.g., splitting, combining) of two or more analog signals; alternatively, analog signals may be coupled, joined, or split in any manner. In particular, signal couplers 1010 may be used to provide samples of transmit signals, as well as to combine interference cancellation signals with other signals (e.g., transmit or receive signals). Alternatively, signal couplers 1010 may be used for any purpose. Signal couplers 1010 may couple and/or split signals using varying amounts of power; for example, a signal coupler 1010 intended to sample a signal may have an input port, an output port, and a sample port, and the coupler 1010 may route the majority of power from the input port to the output port with a small amount going to the sample port (e.g., a 99.9%/0.1% power split between the output and sample port, or any other suitable split).

The signal coupler 1010 is preferably a short section directional transmission line coupler, but may additionally or alternatively be any power divider, power combiner, directional coupler, or other type of signal splitter. The signal coupler 130 is preferably a passive coupler, but may additionally or alternatively be an active coupler (for instance, including power amplifiers). For example, the signal coupler 1010 may comprise a coupled transmission line coupler, a branch-line coupler, a Lange coupler, a Wilkinson power divider, a hybrid coupler, a hybrid ring coupler, a multiple output divider, a waveguide directional coupler, a waveguide power coupler, a hybrid transformer coupler, a cross-connected transformer coupler, a resistive tee, and/or a resistive bridge hybrid coupler. The output ports of the signal coupler 1010 are preferably phase-shifted by ninety degrees, but may additionally or alternatively be in phase or phase shifted by a different amount.

Amplifiers 1020 function to amplify signals of the system 1000. Amplifiers may include any analog or digital amplifiers. Some examples of amplifiers 1020 include low-noise amplifiers (LNA) typically used to amplify receive signals and power amplifiers (PA) typically used to amplify transmit signals prior to transmission.

Frequency upconverters 1030 function to upconvert a carrier frequency of an analog signal (typically from baseband to RF, but alternatively from any frequency to any other higher frequency). Upconverters 1030 preferably accomplish signal upconversion using heterodyning methods, but may additionally or alternatively use any suitable upconversion methods.

The upconverter 1030 preferably includes a local oscillator (LO), a mixer, and a bandpass filter. The local oscillator functions to provide a frequency shift signal to the mixer; the mixer combines the frequency shift signal and the input signal to create (usually two, but alternatively any number) frequency shifted signals, one of which is the desired output signal, and the bandpass filter rejects signals other than the desired output signal.

The local oscillator is preferably a digital crystal variable-frequency oscillator (VFO) but may additionally or alternatively be an analog VFO or any other suitable type of oscillator. The local oscillator preferably has a tunable oscillation frequency but may additionally or alternatively have a static oscillation frequency.

The mixer is preferably an active mixer, but may additionally or alternatively be a passive mixer. The mixer may comprise discrete components, analog integrated circuits (ICs), digital ICs, and/or any other suitable components. The mixer preferably functions to combine two or more electrical input signals into one or more composite outputs, where each output includes some characteristics of at least two input signals.

The bandpass filter is preferably a tunable bandpass filter centered around an adjustable radio frequency. Additionally or alternatively, the bandpass filter may be a bandpass filter centered around a set radio frequency, or any other suitable type of filter. The bandpass filter is preferably a passive filter, but may additionally or alternatively be an active filter. The bandpass filter is preferably implemented with analog circuit components, but may additionally or alternatively be digitally implemented.

In variations in which the bandpass filter is tunable, the center frequency of each tunable filter is preferably controlled by a control circuit or tuning circuit, but may additionally or alternatively be controlled by any suitable system (including manually controlled, e.g. as in a mechanically tuned capacitor). Each tunable bandpass filter preferably has a set quality (Q) factor, but may additionally or alternatively have a variable Q factor. The tunable bandpass filters may have different Q factors; for example, some of the tunable filters may be high-Q, some may be low-Q, and some may be no-Q (flat response).

Frequency downconverters 1040 function to downconvert the carrier frequency of an analog signal (typically to baseband, but alternatively to any frequency lower than the carrier frequency). The downconverter 1040 preferably accomplishes signal downconversion using heterodyning methods, but may additionally or alternatively use any suitable downconversion methods.

The downconverter 1040 preferably includes a local oscillator (LO), a mixer, and a baseband filter. The local oscillator functions to provide a frequency shift signal to the mixer; the mixer combines the frequency shift signal and the input signal to create (usually two) frequency shifted signals, one of which is the desired signal, and the baseband filter rejects signals other than the desired signal.

The local oscillator is preferably a digital crystal variable-frequency oscillator (VFO) but may additionally or alternatively be an analog VFO or any other suitable type of oscillator. The local oscillator preferably has a tunable oscillation frequency but may additionally or alternatively have a static oscillation frequency.

The mixer is preferably an active mixer, but may additionally or alternatively be a passive mixer. The mixer may comprise discrete components, analog ICs, digital ICs, and/or any other suitable components. The mixer preferably functions to combine two or more electrical input signals into one or more composite outputs, where each output includes some characteristics of at least two input signals.

The baseband filter is preferably a lowpass filter with a tunable low-pass frequency. Additionally or alternatively, the baseband filter may be a lowpass filter with a set low-pass frequency, a bandpass filter, or any other suitable type of filter. The baseband filter is preferably a passive filter, but may additionally or alternatively be an active filter. The baseband filter is preferably implemented with analog circuit components, but may additionally or alternatively be digitally implemented.

While the bandpass filter of the frequency upconverter 1030 and the baseband filter of the frequency downconverter 1040 are necessary for performing frequency upconversion and downconversion, they also may be useful for filtering transmit and/or receive band signals. This is discussed in more detail in the sections on filtering and cancellation systems 1100, 1200, 1300, and 1400, but in general, the same filters that reject image frequencies generated by mixers may also reject signals outside of a desired band of interest.

For example, an RF receive signal may contain one or more signal components in a receive band (at 5690 MHz) and interference due to an undesired signal in a nearby transmit band (at 5670 MHz). When these signals are downconverted to baseband by a receiver (or other downconverter with an LO at the receive band frequency), they are first processed by the mixer, which generates four signals:

5690 MHz±5690 MHz and 5690 MHz±5670 MHz
0 MHz, 20 MHz, 11.38 GHz, 11.36 GHz

The 11 GHz frequencies are easily filtered by the filter of the downconverter, but the filter may additionally be used to filter out that 20 MHz signal as well (reducing transmit band presence in the baseband receive signal). In this way, frequency downconversion can be used to assist other filtering or interference cancellation systems of the system 1000.

Note that while the upconverter 1040 also performs filtering, and that filtering may be used to filter out undesired signals, filtering during upconversion may be less effective than filtering during downconversion. One reason for this is architecture-based; power amplification is typically performed after upconversion (and power amplification may amount for a large part of interference generation in other bands). That being said, it may still be useful to filter a signal prior to amplification, and noisy amplification is not always performed for all upconverted signals (e.g., digital transmit signal samples converted to RF). Another reason is that the upconverter bandpass frequency is centered around the RF frequency (or other frequency higher than baseband), which means that for a given amount of cancellation required, the filter must have a higher quality factor (Q).

For example, if a filter is desired to reject 30 dB at 20 MHz away from an RF center frequency of 5 GHz (that is, after upconversion or before downconversion), the Q of that filter must be higher than a low-pass filter desired to rejected 30 dB at 20 MHz away from baseband.

Analog-to-digital converters (ADCs) 1050 function to convert analog signals (typically at baseband, but additionally or alternatively at any frequency) to digital signals. ADCs 1050 may be any suitable analog-to-digital converter; e.g., a direct-conversion ADC, a flash ADC, a successive-approximation ADC, a ramp-compare ADC, a Wilkinson ADC, an integrating ADC, a delta-encoded ADC, a time-interleaved ADC, or any other suitable type of ADC.

Digital-to-analog converters (DACs) 1060 function to convert digital signals to analog signals (typically at baseband, but additionally or alternatively at any frequency). The DAC 1060 may be any suitable digital-to-analog converter; e.g., a pulse-width modulator, an oversampling DAC, a binary-weighted DAC, an R-2R ladder DAC, a cyclic DAC, a thermometer-coded DAC, or a hybrid DAC.

Time delays 1070 function to delay signal components. Delays 1070 may be implemented in analog (e.g., as a time delay circuit) or in digital (e.g., as a time delay function). Delays 1070 may be fixed, but may additionally or alternatively introduce variable delays. The delay 1070 is preferably implemented as an analog delay circuit (e.g., a bucket-brigade device, a long transmission line, a series of RC networks) but may additionally or alternatively be implemented in any other suitable manner. If the delay 1070 is a variable delay, the delay introduced may be set by a tuning circuit or other controller of the system 1000. Although not necessarily explicitly shown in figures, delays 1070 may be coupled to the system 1000 in a variety of ways to delay one signal relative to another. For example, delays 1070 may be used to delay a receive or transmit signal to account for time taken to generate an interference cancellation signal (so that the two signals may be combined with the same relative timing). Delays 1070 may potentially be implemented as part of or between any two components of the system 1000.

The TxICS 1100 functions to mitigate interference present in the transmit band of a signal using self-interference cancellation techniques; that is, generating a self-interference cancellation signal by transforming signal samples of a first signal (typically a transmit signal) into a representation of self-interference present in another signal (e.g., a receive signal, a transmit signal after amplification, etc.), due to transmission of the first signal and then subtracting that interference cancellation signal from the other signal.

The TxICS 1100 is preferably used to cancel interference present in the transmit band of a receive signal; i.e., the TxICS 1100 generates an interference cancellation signal from samples of a transmit signal using a circuit that models the representation of the transmit signal, in the transmit band, as received by a receiver, and subtracts that cancellation signal from the receive signal.

The TxICS 1100 may additionally be used to cancel interference present in the transmit band (TxB) of a transmit signal sample; i.e., the TxICS 1100 generates an interference cancellation signal from samples of a transmit signal using a circuit that models the representation of the transmit signal, in the transmit band, as generated by a transmitter (generally, but not necessarily, before transmission at an antenna), and subtracts that cancellation signal from the transmit signal sample. This type of interference cancellation is generally used to 'clean' a transmit signal sample; that is, to remove transmit band signal of a transmit sample, so that the sample contains primarily information in the receive band (allowing the sample to be used to perform receive-band interference cancellation, typically using the RxICS 1300).

The TxICS 1100 comprises at least one of a digital TX interference canceller (TxDC) 1110 and an analog TX interference canceller (TxAC) 1120. In the case that the TxICS 1100 performs both receive signal cancellation and transmit sample cancellation, the TxICS 1100 may include separate cancellers to perform these tasks; additionally or alternatively, the TxICS 1100 may include any number of cancellers for any purpose (e.g., one canceller performs both tasks, many cancellers perform a single task, etc.).

The TxDC 1110 functions to produce a digital interference cancellation signal from a digital input signal according to a digital transform configuration. The TxDC 1110 may be used to cancel interference in any signal, using any input, but the TxDC 1110 is preferably used to cancel transmit band interference in an analog receive signal (by converting a digital interference cancellation signal to analog using a DAC 1060 and combining it with the analog receive signal). The TxDC 1110 may also be used to cancel transmit band signal components in a transmit signal (to perform transmit signal cleaning as previously described).

Using upconverters 1030, downconverters 1040, ADCs 1050, and DACs 1060, the TxDC 1110 may convert analog signals of any frequency to digital input signals, and may additionally convert interference cancellation signals from digital to analog signals of any frequency.

The digital transform configuration of the TxDC 1110 includes settings that dictate how the TxDC 1110 transforms a digital transmit signal to a digital interference signal (e.g. coefficients of a generalized memory polynomial used to transform a transmit signal to an interference cancellation signal). The transform configuration for a TxDC 1110 is preferably set adaptively by a transform adaptor, but may additionally or alternatively be set by any component of the system 1000 (e.g., a tuning circuit) or fixed in a set transform configuration.

The TxDC 1110 is preferably substantially similar to the digital self-interference canceller of U.S. Provisional Application No. 62/268,388, the entirety of which is incorporated by this reference, except in that the TxDC 1110 is not necessarily applied solely to cancellation of interference in a receive signal resulting from transmission of another signal (as previously described).

Figure 9:
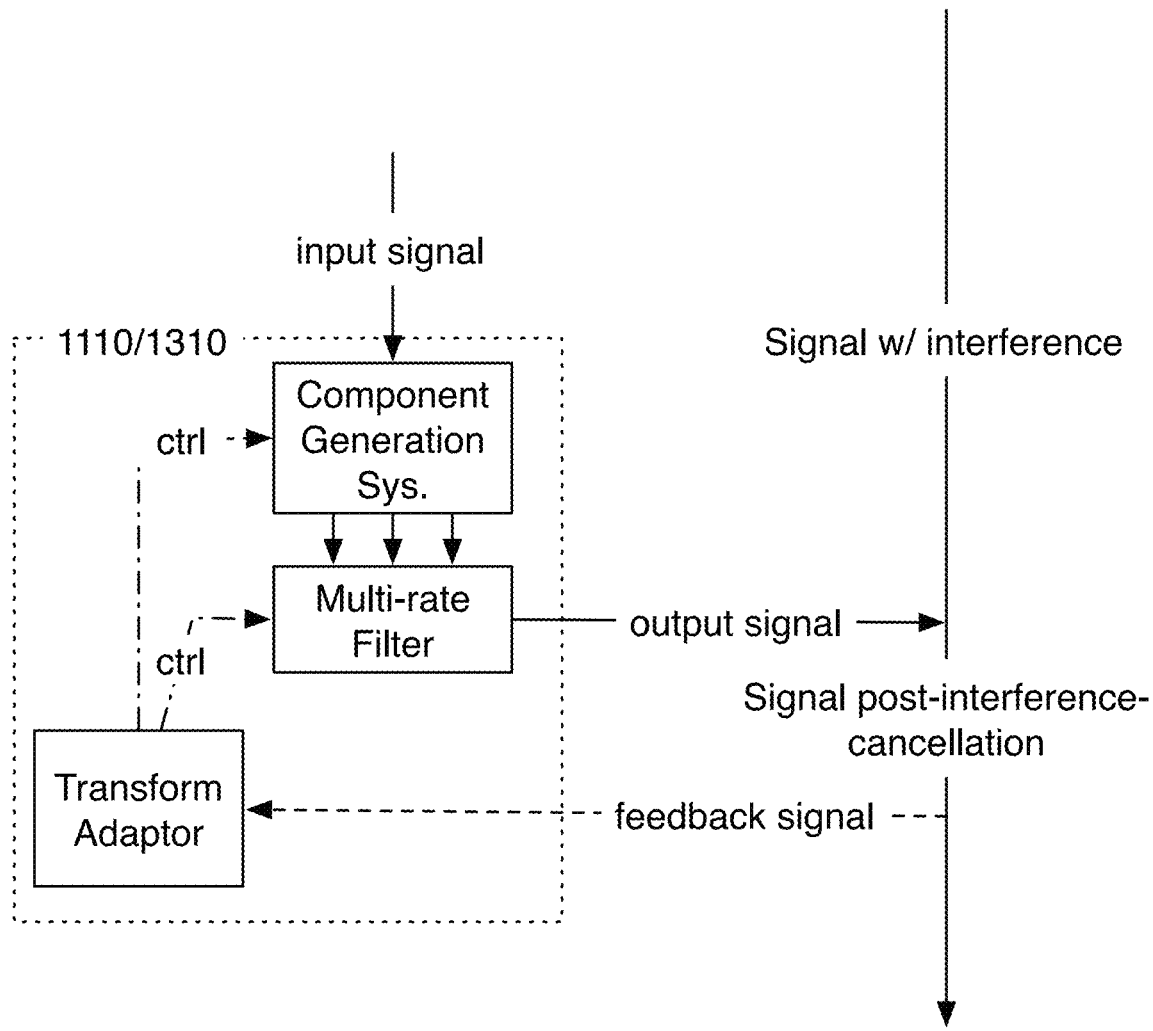
FIG. 9 is a diagram representation of a digital interference canceller of a system of a preferred embodiment.

In one implementation of a preferred embodiment, the TxDC 1110 includes a component generation system, a multi-rate filter, and a transform adaptor, as shown in FIG. 9.

The component generation system functions to generate a set of signal components from the sampled input signal (or signals) that may be used by the multi-rate filter to generate an interference cancellation signal. The component generation system preferably generates a set of signal components intended to be used with a specific mathematical model (e.g., generalized memory polynomial (GMP) models, Volterra models, and Wiener-Hammerstein models); additionally or alternatively, the component generation system may generate a set of signal components usable with multiple mathematical models.

In some cases, the component generator may simply pass a copy of a sampled transmit signal unmodified; this may be considered functionally equivalent to a component generator not being explicitly included for that particular path.

The multi-rate adaptive filter functions to generate an interference cancellation signal from the signal components produced by the component generation system. In some implementations, the multi-rate adaptive filter may additionally function to perform sampling rate conversions (similarly to an upconverter 1030 or downconverter 1040, but applied to digital signals). The multi-rate adaptive filter preferably generates an interference cancellation signal by combining a weighted sum of signal components according to mathematical models adapted to model interference contributions of the transmitter, receiver, channel and/or other sources. Examples of mathematical models that may be used by the multi-rate adaptive filter include generalized memory polynomial (GMP) models, Volterra models, and Wiener-Hammerstein models; the multi-rate adaptive filter may additionally or alternatively use any combination or set of models.

The transform adaptor functions to set the transform configuration of the multi-rate adaptive filter and/or the component generation system. The transform configuration preferably includes the type of model or models used by the multi-rate adaptive filter as well as configuration details pertaining to the models (each individual model is a model type paired with a particular set of configuration details). For example, one transform configuration might set the multi-rate adaptive filter to use a GMP model with a particular set of coefficients. If the model type is static, the transform configuration may simply include model configuration details; for example, if the model is always a GMP model, the transform configuration may include only coefficients for the model, and not data designating the model type.

The transform configuration may additionally or alternatively include other configuration details related to the signal component generation system and/or the multi-rate adaptive filter. For example, if the signal component generation system includes multiple transform paths, the transform adaptor may set the number of these transform paths, which model order their respective component generators correspond to, the type of filtering used, and/or any other suitable details. In general, the transform configuration may include any details relating to the computation or structure of the signal component generation system and/or the multi-rate adaptive filter.

The transform adaptor preferably sets the transform configuration based on a feedback signal sampled from a signal post-interference-cancellation (i.e., a residue signal). For example, the transform adaptor may set the transform configuration iteratively to reduce interference present in a residue signal. The transform adaptor may adapt transform configurations and/or transform-configuration-generating algorithms using analytical methods, online gradient-descent methods (e.g., LMS, RLMS), and/or any other suitable methods. Adapting transform configurations preferably includes changing transform configurations based on learning. In the case of a neural-network model, this might include altering the structure and/or weights of a neural network based on test inputs. In the case of a GMP polynomial model, this might include optimizing GMP polynomial coefficients according to a gradient-descent method.

Note that TxDC 1110 may share transform adaptors and/or other components (although each TxDC 1110 is preferably associated with its own transform configuration).

The TxAC 1120 functions to produce an analog interference cancellation signal from an analog input signal. The TxAC 1120 may be used to cancel interference in any signal, using any input, but the TxAC 1120 is preferably used to cancel transmit band interference in an analog receive signal. The TxAC 1120 may also be used to cancel transmit band signal components in a transmit signal sample (to perform transmit signal cleaning as previously described).

Using upconverters 1030, downconverters 1040, ADCs 1050, and DACs 1060, the TxAC 1120 may convert digital signals to analog input signals, and may additionally convert interference cancellation signals from analog to digital (or to another analog signal of different frequency).

The TxAC 1120 is preferably designed to operate at a single frequency band, but may additionally or alternatively be designed to operate at multiple frequency bands. The TxAC 1120 is preferably substantially similar to the circuits related to analog self-interference cancellation of U.S. patent application Ser. No. 14/569,354 (the entirety of which is incorporated by this reference); e.g., the RF self-interference canceller, the IF self-interference canceller, associated up/downconverters, and/or tuning circuits, except that the TxAC 1120 is not necessarily applied solely to cancellation of interference in a receive signal resulting from transmission of another signal (as previously described).

The TxAC 1120 is preferably implemented as an analog circuit that transforms an analog input signal into an analog interference cancellation signal by combining a set of filtered, scaled, and/or delayed versions of the analog input signal, but may additionally or alternatively be implemented as any suitable circuit. For instance, the TxAC 1120 may perform a transformation involving only a single version, copy, or sampled form of the analog input signal. The transformed signal (the analog interference cancellation signal) preferably represents at least a part of an interference component in another signal.

The TxAC 1120 is preferably adaptable to changing self-interference parameters in addition to changes in the input signal; for example, transceiver temperature, ambient temperature, antenna configuration, humidity, and transmitter power. Adaptation of the TxAC 1120 is preferably performed by a tuning circuit, but may additionally or alternatively be performed by a control circuit or other control mechanism included in the canceller or any other suitable controller (e.g., by the transform adaptor of the TxDC 1110).

Figure 10:
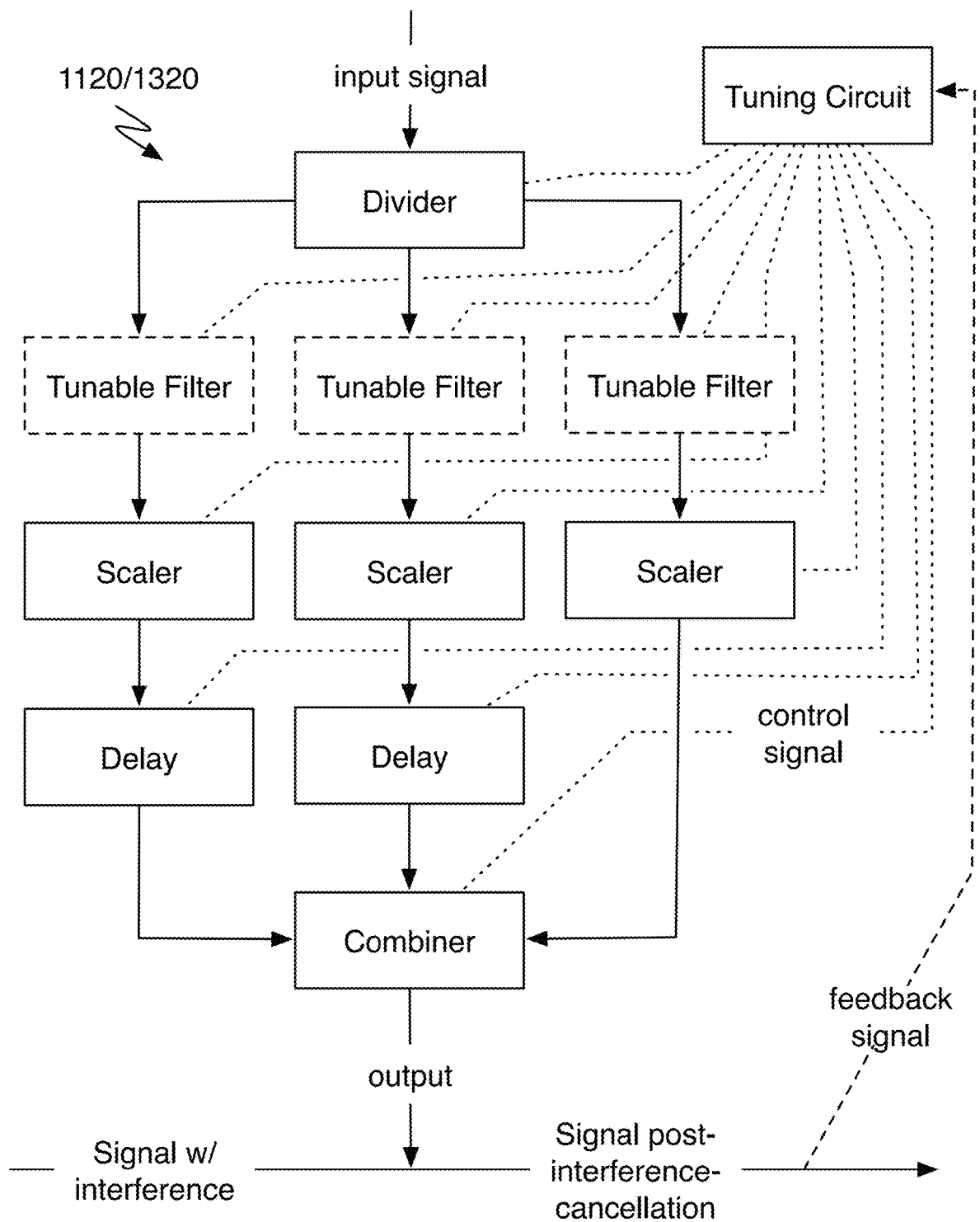
FIG. 10 is a diagram representation of an analog interference canceller of a system of a preferred embodiment.

In one implementation of a preferred embodiment, the TxAC 1120 includes a set of scalers (which may perform gain, attenuation, or phase adjustment), a set of delays, a signal combiner, a signal divider, and a tuning circuit, as shown in FIG. 10. In this implementation the TxAC 1120 may optionally include tunable filters (e.g., bandpass filters including an adjustable center frequency, lowpass filters including an adjustable cutoff frequency, etc.).

The tuning circuit preferably adapts the TxAC 1120 configuration (e.g., parameters of the filters, scalers, delayers, signal divider, and/or signal combiner, etc.) based on a feedback signal sampled from a signal after interference cancellation is performed (i.e., a residue signal). For example, the tuning circuit may set the TxAC 1120 configuration iteratively to reduce interference present in a residue signal. The tuning circuit preferably adapts configuration parameters using online gradient-descent methods (e.g., LMS, RLMS), but configuration parameters may additionally or alternatively be adapted using any suitable algorithm. Adapting configuration parameters may additionally or alternatively include alternating between a set of configurations. Note that TxACs may share tuning circuits and/or other components (although each TxAC 1120 is preferably associated with a unique configuration or architecture). The tuning circuit may be implemented digitally and/or as an analog circuit.

Figure 11:
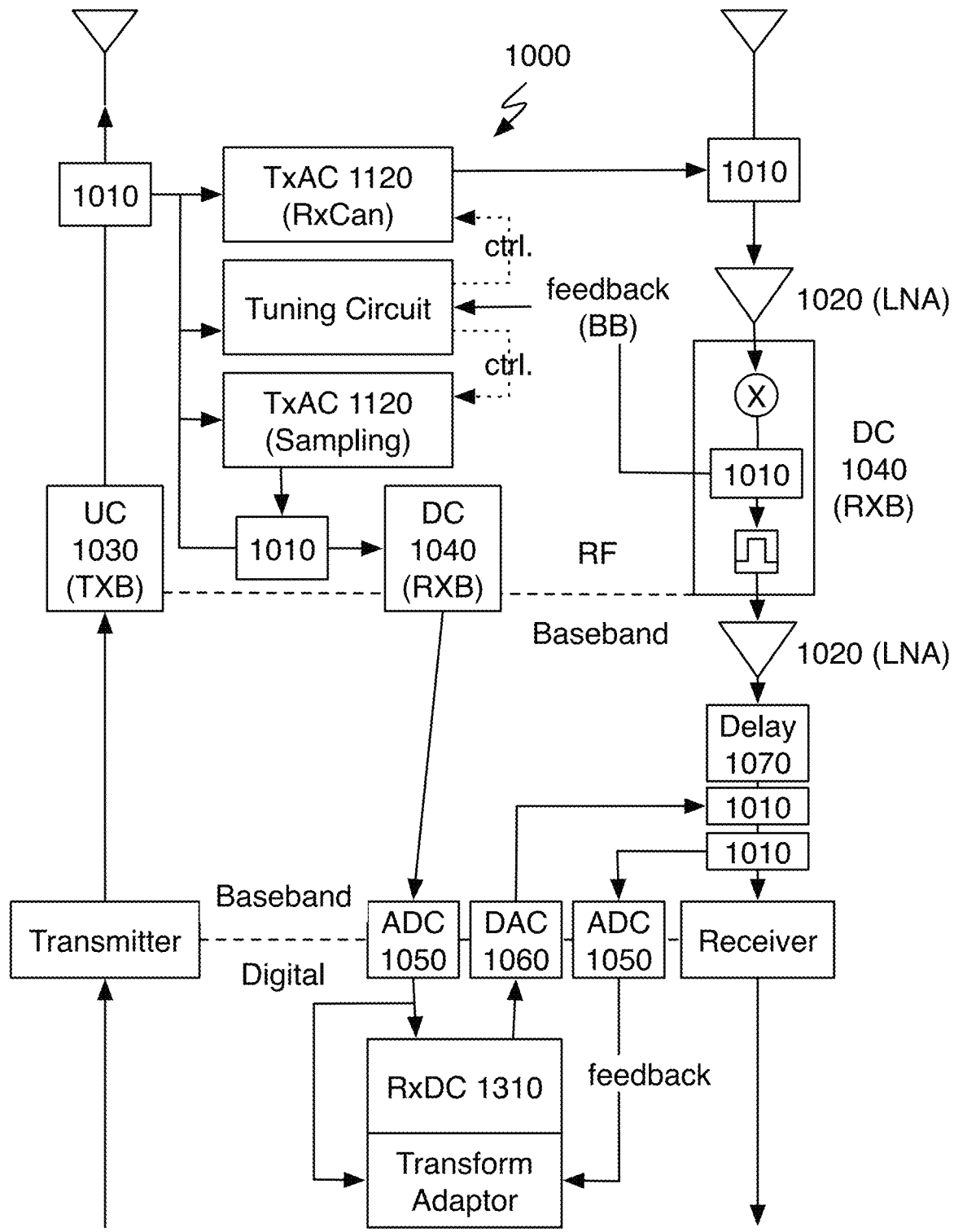
FIG. 11 is a diagram representation of a system of a preferred embodiment.

In one implementation of a preferred embodiment, the TxICS 1100 performs interference cancellation solely using analog cancellation, as shown in FIG. 11. In this implementation, the TxICS 1100 includes a TxAC 1120 (RxCan) used to cancel transmit band signal components present in the receive signal as well as a TxAC 1120 used to clean transmit signal samples (as previously described) for use by an RxICS 1300; both cancellers are controlled by a single tuning circuit, which receives input from both the transmit signal and from the residue signal. Note that as shown in FIG. 11, the tuning circuit takes a baseband feedback signal from the downconverter 1040 after mixing, but prior to final filtering. While it would also be possible for the tuning circuit to receive an RF feedback signal from before the downconverter 1040, note that in this implementation the filter of the downconverter 1040 may be used to remove transmit band signal components remaining after cancellation. Because the presence of these signal components prior to filtering is an indication of the performance of the RxCan TxAC 1120, it may be preferred for the tuning circuit to sample a residue signal prior to filtering that removes transmit band signal components. Alternatively, the tuning circuit may sample any signals at any point.

Figure 12:
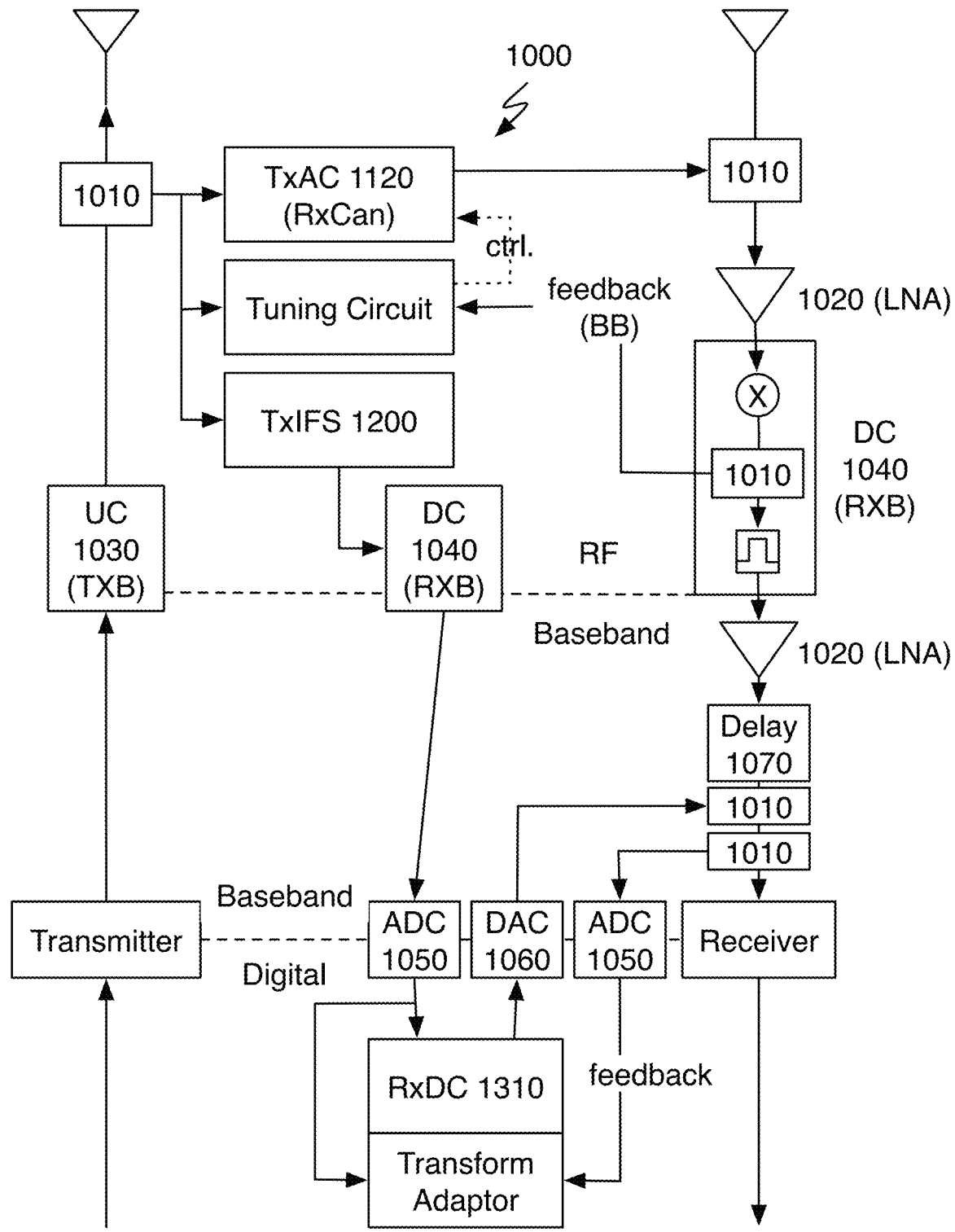
FIG. 12 is a diagram representation of a system of a preferred embodiment.

In a variation of this implementation, the system may utilize a combination of transmit band filtering (using TxIFS 1200) and cancellation, as shown in FIG. 12.

Figure 13:
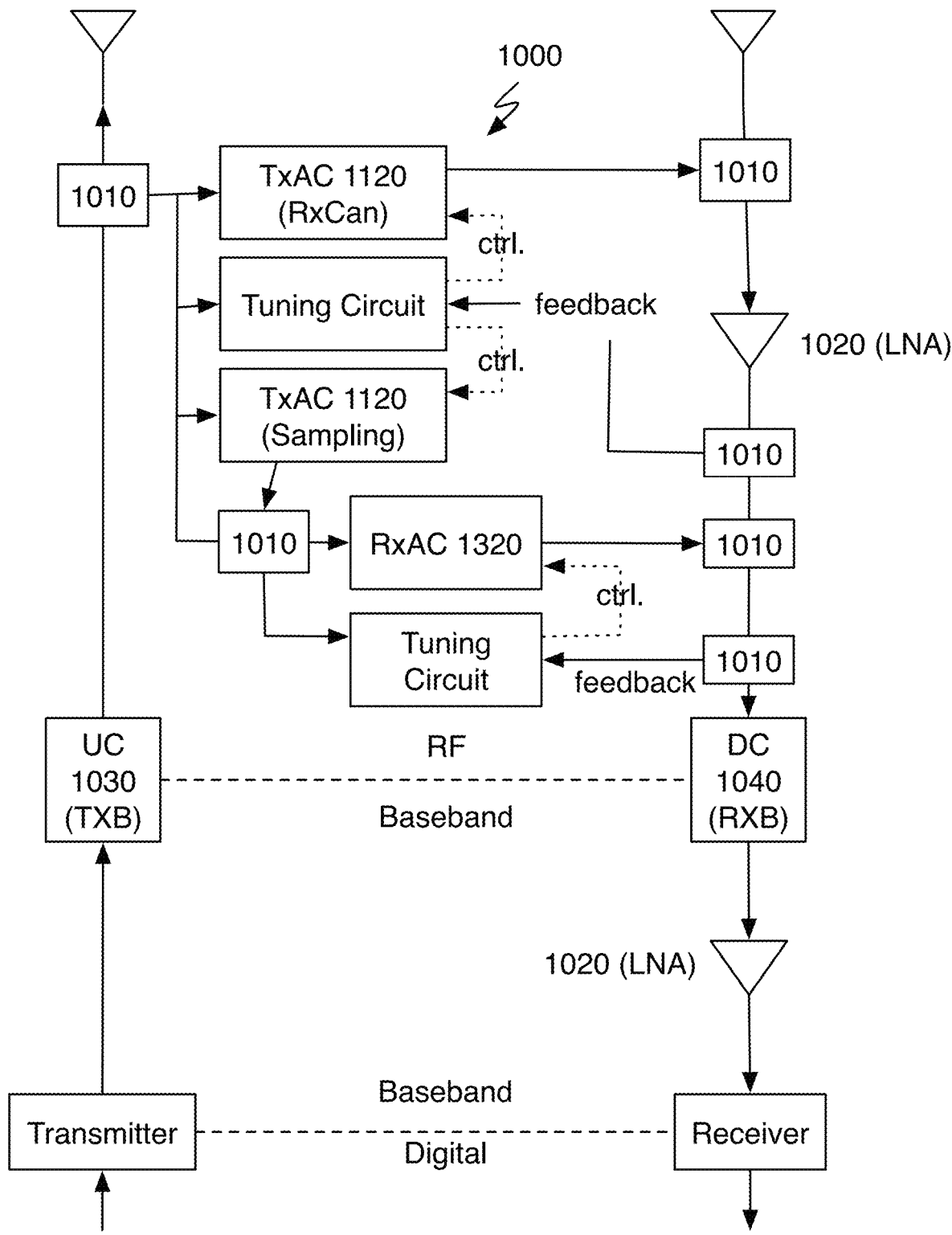
FIG. 13 is a diagram representation of a system of a preferred embodiment.
Figure 14:
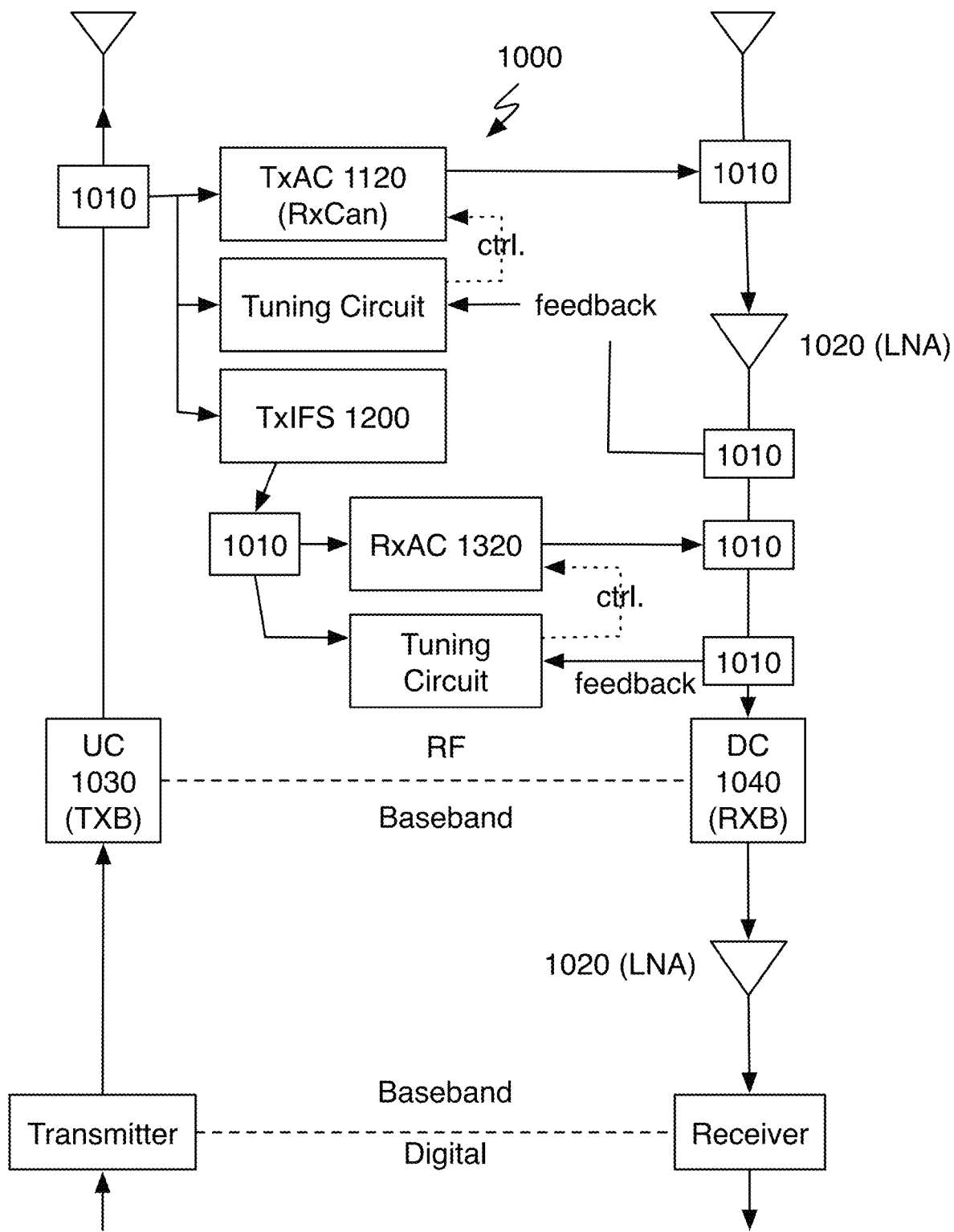
FIG. 14 is a diagram representation of a system of a preferred embodiment.

As shown in FIGS. 11 and 12, the RxICS 1300 (including an RxDC 1310 and associated components) is implemented digitally, but may additionally or alternatively be implemented in analog (including an RxAC 1320 and associated components), as shown in FIGS. 13 and 14. The TxICS 1100 and/or RxICS 1300 may be implemented in digital domains, analog domains, or a combination of the two.

Figure 15:
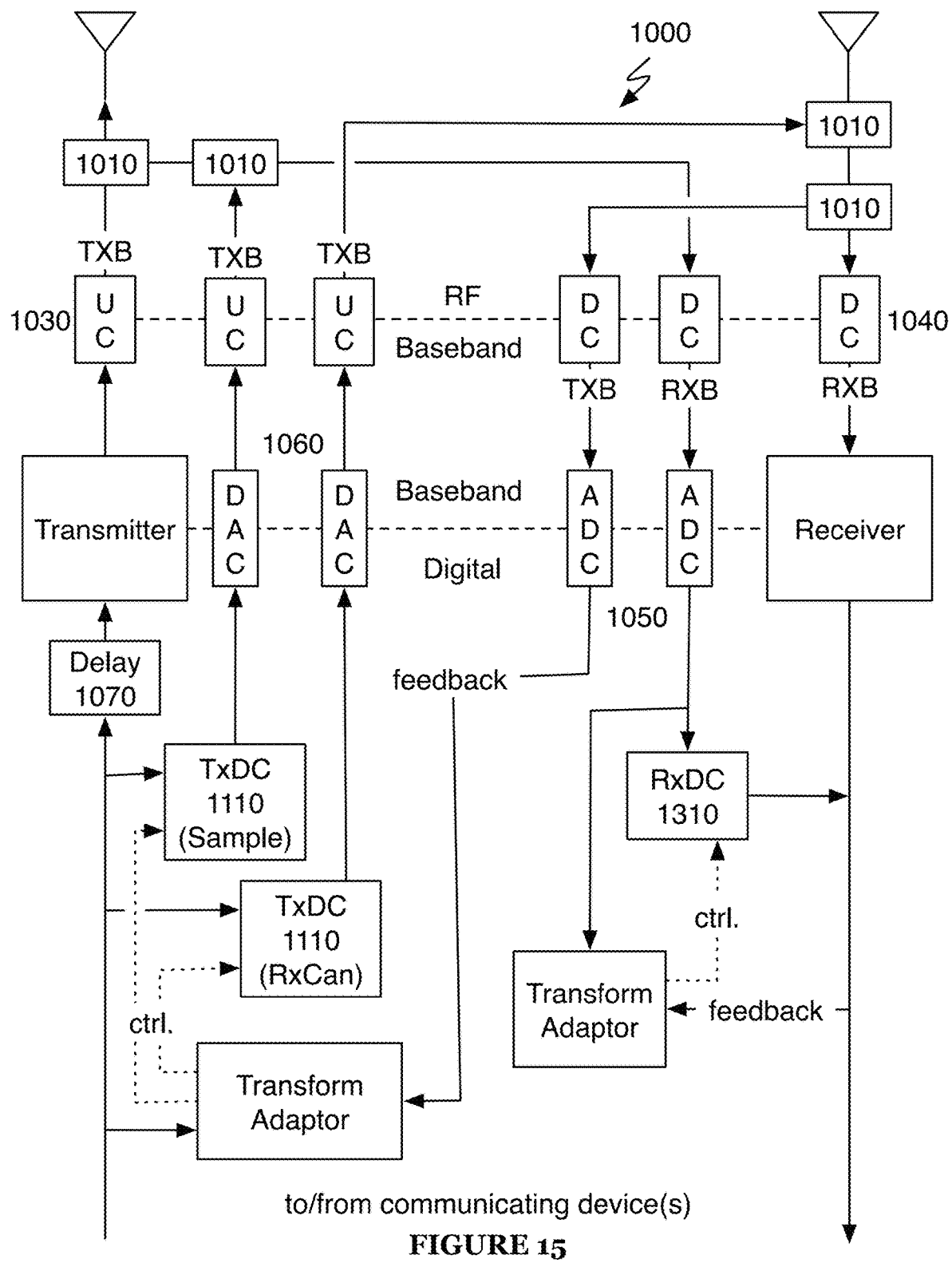
FIG. 15 is a diagram representation of a system of a preferred embodiment.

In one implementation of a preferred embodiment, the TxICS 1100 performs interference cancellation solely using digital cancellation, as shown in FIG. 15. In this implementation, the TxICS 1100 includes a TxDC 1110 (RxCan) used to cancel transmit band signal components present in the receive signal as well as a TxDC 1110 (Sample) used to clean transmit signal samples for use by an RxICS 1300; both cancellers are controlled by a single transform adaptor, which receives input from both the transmit signal and from the residue signal. Note that in this implementation, the RxDC 1310 receives an input signal derived from a combination of the upconverted output of the Sample TxDC 1110 with the upconverted transmit signal, but additionally or alternatively the RxDC 1310 may receive an input signal directly from the digital transmit path. As shown in FIGS. 11 and 12, the RxICS 1300 is implemented digitally, but may additionally or alternatively be implemented in analog, as shown in FIGS. 13 and 14. The TxICS 1100 and/or RxICS 1300 may be implemented in digital domains, analog domains, or a combination of the two.

Note that while as shown in these FIGURES, the TxCan and Sample cancellers sample the transmit signal on parallel paths, multiple cancellers of the TxICS 1100 may share switched signal paths (e.g., the coupler 1010 coupled to the transmit antenna in FIG. 11 may switch between the RxCan TxAC 1120 and the Sampling TxAC 1120).

The TxIFS 1200 functions to mitigate interference present in the transmit band of a signal by performing filtering in the transmit band. The TxIFS 1200 is preferably used to filter out interference present in the transmit band of a receive signal; e.g., the TxIFS 1200 includes a filter on the receive signal that allows signal components in the receive band to pass while blocking signal components in the transmit band.

The TxIFS 1200 may additionally or alternatively be used to filter out interference present in the transmit band of a transmit signal sample; e.g., to generate a transmit signal sample that includes primarily signal components in the receive band (as a way to estimate interference generated in the receive band of the receive signal by the transmit signal). Transmit samples cleaned in this way may be used to perform receive-band interference cancellation, typically using the RxICS 1300.

The TxIFS 1200 preferably includes one or more tunable bandpass filters. Alternatively, the TxIFS 1200 may include any type of filter. For example, the TxIFS 1200 may include a notch filter to remove transmit band signal components only. Filters of the TxIFS 1200 are preferably used for RF signals, but may additionally or alternatively be used for any frequency analog signal.

Filters of the TxIFS 1200 preferably transform signal components according to the response of the filter, which may introduce a change in signal magnitude, signal phase, and/or signal delay. Filters of the TxIFS 1200 are preferably formed from a combination (e.g., in series and/or in parallel) of resonant elements. Resonant elements of the filters are preferably formed by lumped elements, but may additionally or alternatively be distributed element resonators, ceramic resonators, SAW resonators, crystal resonators, cavity resonators, or any suitable resonators.

Filters of the TxIFS 1200 are preferably tunable such that one or more peaks of the filters may be shifted. In one implementation of a preferred embodiment, one or more resonant elements of a filter may include a variable shunt capacitance (e.g., a varactor or a digitally tunable capacitor) that enables filter peaks to be shifted. Additionally or alternatively, filters may be tunable by quality factor (i.e., Q may be modified by altering circuit control values), or filters may be not tunable. Filters 145 may include, in addition to resonant elements, delayers, phase shifters, and/or scaling elements. The filters are preferably passive filters, but may additionally or alternatively be active filters. The filters are preferably implemented with analog circuit components, but may additionally or alternatively be digitally implemented. The center frequency of any tunable peak of a filter is preferably controlled by a tuning circuit, but may additionally or alternatively be controlled by any suitable system (including manually controlled, e.g. as in a mechanically tuned capacitor).

In some implementations, the system can include both a TxIFS 1200 and a TxICS 1100 that are cooperatively operated. For example, the TxIFS 1200 may include a filter with a tunable quality factor, and TxICS 1100 operation may be tuned based on the quality factor of the filter (e.g., selection of a lower quality factor may cause the TxICS 1100 to be adaptively configured to reduce interference over a wider range of signal components). In another example, the TxIFS 1200 and TxICS 1100 may be each be switched in and out of the receive and transmit path, respectively (e.g., the TxIFS is switched into the receive path when the TxICS is switched out of the transmit path, and vice versa). The TxIFS 1200 and/or TxICS 1100 may additionally or alternatively be configured in any suitable manner.

The RxICS 1300 functions to mitigate interference present in the receive band of a signal using self-interference cancellation techniques; that is, generating a self-interference cancellation signal by transforming signal samples of a first signal (typically a transmit signal) into a representation of self-interference present in another signal, due to transmission of the first signal (e.g., a receive signal, a transmit signal after amplification, etc.) and then subtracting that interference cancellation signal from the other signal.

The RxICS 1300 is preferably used to cancel interference present in the receive band of a receive signal; i.e., the RxICs 1300 generates an interference cancellation signal from samples of receive ba downconverter 2040 nd components of a transmit signal using a circuit that models the representation of the transmit signal, in the receive band, as received by a receiver, and subtracts that cancellation signal from the receive signal.

The RxICS 1300 preferably receives as input samples of a transmit signal that has been filtered (e.g., by the TxIFS 1200) or interference cancelled (e.g., by the TxICS 1100) to reduce the presence of transmit band components (allowing for better estimation of interference due to signal components of the transmit signal that are in the receive band).

The RxICS 1300 preferably cancels interference on a receive signal that has already experienced transmit band cancellation and/or filtering, but additionally or alternatively, the RxICS 1300 may cancel interference on a receive signal that has not experienced transmit band cancellation or filtering.

The RxICS 1300 comprises at least one of a digital RX interference canceller (RxDC) 1310 and an analog RX interference canceller (RxAC) 1320.

The RxDC 1310 is preferably substantially similar to the TxDC 1110, but may additionally or alternatively be any suitable digital interference canceller.

The RxAC 1320 is preferably substantially similar to the TxAC 1120, but may additionally or alternatively be any suitable analog interference canceller.

The RxIFS 1400 functions to mitigate interference present in the receive band of a transmit signal by performing filtering in the receive band. The RxIFS 1400, if present, functions to remove receive-band signal components in a transmit signal prior to transmission (but preferably post-power-amplification). Filters of the RxIFS 1400 are preferably substantially similar to those of the TxIFS 1200, but the RxIFS may additionally or alternatively include any suitable filters.

In some implementations, the system can include both an RxIFS 1400 and an RxICS 1300 that are cooperatively operated. For example, the RxIFS 1400 may include a filter with a tunable quality factor, and RxICS 1300 operation may be tuned based on the quality factor of the filter (e.g., selection of a lower quality factor may cause the RxICS 1300 to be adaptively configured to reduce interference over a wider range of signal components). In another example, the RxIFS 1400 and RxICS 1300 may be each be switched in and out of the transmit and receive path, respectively (e.g., the RxIFS is switched into the transmit path when the RxICS is switched out of the receive path, and vice versa). The RxIFS 1400 and/or RxICS 1300 may additionally or alternatively be configured in any suitable manner.

In some implementations, the system can include a TxICS 1100, TxIFS 1200, RxICS 1300, and RxIFS 1400. Each of the TxICS, TxIFS, RxICS, and RxIFS may be controlled based on the performance and/or operation of any of the other subsystems, or alternatively based on any suitable conditions. For example, the TxIFS 1200 may include a filter with an adjustable Q-factor, and the RxICS 1300 may include a transform adaptor that is controlled according to the Q-factor of the filter of the TxIFS 1200 (e.g., adjusting the filter to a high Q-factor corresponds to a transform configuration that removes signal components in a narrow frequency band corresponding to the pass band of the filter).

2. Linearized-Mixer Out-of-Band Interference Mitigation Systems

While the system 1000 performs admirably in many interference mitigation applications, non-linearities introduced to the receive signal by frequency downconverters 1040 may reduce system performance. A system 2000 for linearized-mixer out-of-band interference mitigation addresses this potential issue with the use of enhanced-linearity mixing (thus reducing the extent to which non-linearities are introduced to the system).

Like the system 1000, the system 2000 for linearized-mixer out-of-band interference mitigation includes a receive band interference cancellation system (RxICS) 2300 and at least one of a transmit band interference cancellation system (TxICS) 2100 and a transmit band interference filtering system (TxIFS) 2200. The system 2000 may additionally or alternatively include a receive band filtering system (RxIFS) 2400. The system 2000 may additionally include any number of additional elements to enable interference cancellation and/or filtering, including signal couplers 2010, amplifiers 2020, frequency upconverters 2030, frequency downconverters 2040, analog-to-digital converters (ADC) 2050, digital-to-analog converters (DAC) 2060, time delays 2070, and any other circuit components (e.g., phase shifters, attenuators, transformers, filters, etc.).

The components of the system 2000 are substantially similar to their counterparts in the system 1000 with the exception of the frequency downconverters 2040.

Like the frequency downconverters 1040, the frequency downconverters 2040 function to downconvert the carrier frequency of an analog signal (typically to baseband, but alternatively to any frequency lower than the carrier frequency). The downconverter 2040 preferably accomplishes signal downconversion using heterodyning methods, but may additionally or alternatively use any suitable downconversion methods.

Figure 16:
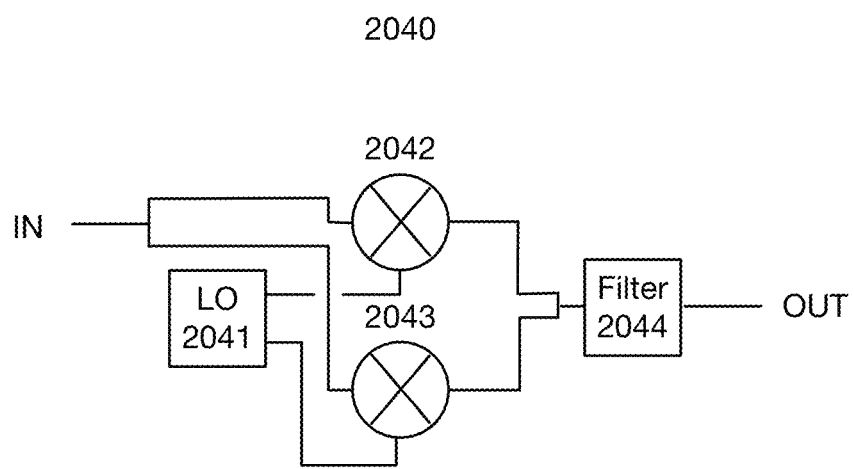
FIG. 16 is a diagram representation of a linearized mixer of a system of a preferred embodiment.

The frequency downconverter 2040 preferably includes a local oscillator (LO) 2041, a primary mixer 2042, a distortion-source mixer 2043, and a baseband filter 2044 as shown in FIG. 16.

The local oscillator 2041 functions to provide a frequency shift signal to the mixers 2042/2043; the mixers 2042/2043 combine the frequency shift signal and the input signal to create (usually two) frequency shifted signals, one of which is the desired signal, and the baseband filter 2044 rejects signals other than the desired signal.

The local oscillator 2041 is preferably a digital crystal variable-frequency oscillator (VFO) but may additionally or alternatively be an analog VFO or any other suitable type of oscillator. The 2041 local oscillator preferably has a tunable oscillation frequency but may additionally or alternatively have a static oscillation frequency.

Operating on a general principle similar to the self-interference cancellation techniques discussed in Section 1, the frequency downconverter 2040 utilizes components (e.g., the distortion-source mixer 2043) to model and subtract distortion present in the output of the primary mixer 2042 (or a more general circuit including the primary mixer 2042), thus creating a more linear output of the frequency downconverter 2040 than that of the primary mixer 2042 alone.

The primary mixer 2042 functions to convert an input signal from a first frequency to a second frequency; e.g., from radio frequency (RF) to intermediate frequency (IF) or baseband, or from baseband to RF or IF, or from IF to baseband or RF.

The primary mixer 2042 is preferably an active mixer, but may additionally or alternatively be a passive mixer. The primary mixer 2042 may comprise discrete components, analog integrated circuits (ICs), digital ICs, and/or any other suitable components. The primary mixer 2042 preferably functions to combine two or more electrical input signals into one or more composite outputs, where each output includes some characteristics of at least two input signals.

Given an input signal centered at frequency f1 and frequency shift signal at frequency f2, the primary mixer 2042 may produce output signals (each a product of the input signal and the frequency shift signal) at each of the following frequencies: $f = nf_1 + mf_2$, where n and m are integers. Take, for example, that f1 is 900 MHz, f2 is 750 MHz, and the desired output frequency is 150 MHz. In this example, the problematic outputs are those around 150 MHz, other from the primary output that is at $f_1 - f_2$. In this example, the outputs other than the primary output that are near the desired frequency are at $\{\{n, m\}\} = \{\{-4, 5\}, \{6, -7\}\}$ (which are, for most mixer applications, negligible).

Figure 17:
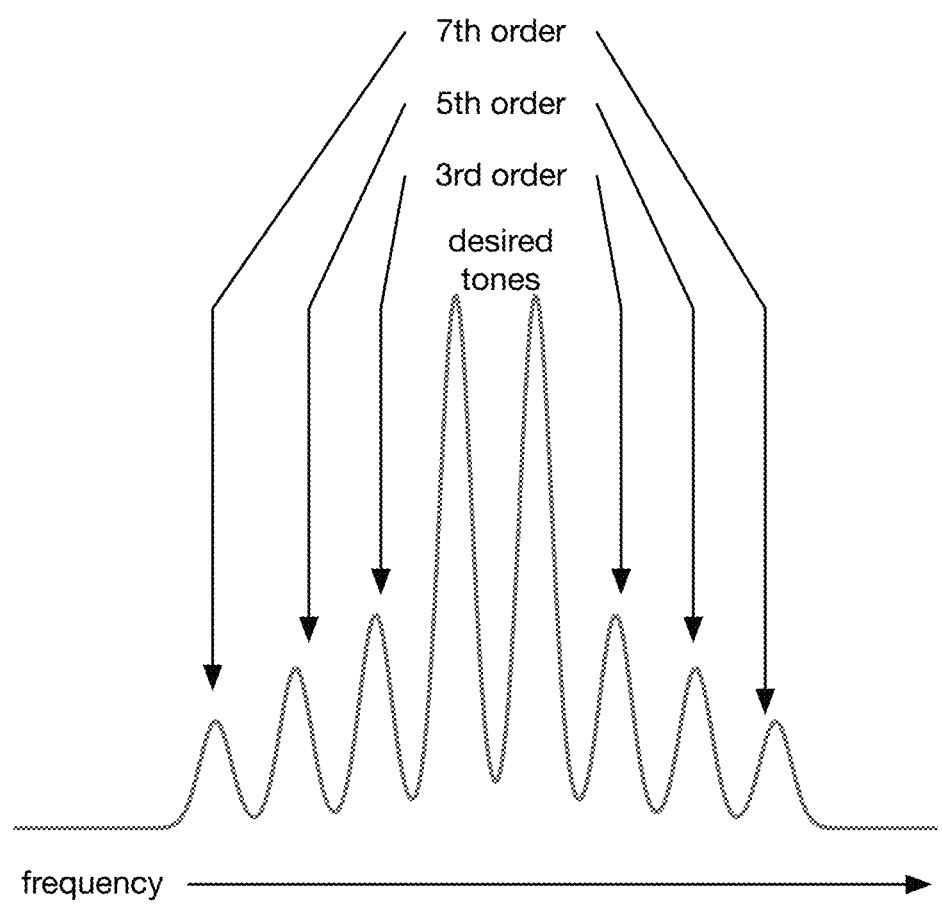
FIG. 17 is a signal representation of non-linear distortion resulting from mixing.

Unfortunately, the situation is more complicated when the primary mixer 2042 encounters multiple closely spaced signals simultaneously (as is common in communications). Now assume two input signals at f1 and f2, and frequency shift at f3; now products can be produced at all $f = nf_1 + mf_2 + of_3$. Assuming now that f1 is 900.00 MHz, f2 is 900.050 MHz, f3 is 750 MHz, and the desired output frequencies are 150.000 and 150.050 MHz. Now, there are troubling outputs: $\{\{n, m, o\}\} = \{\{2, -1, -1\}, \{-1, 2, -1\}\}$ (third order terms), $\{\{n, m, o\}\} = \{\{3, -2, -1\}, \{-2, 3, -1\}\}$ (fifth order terms), and $\{\{n, m, o\}\} = \{\{4, -3, -1\}, \{-3, 4, -1\}\}$ (seventh order terms). These outputs are as shown in FIG. 17. Note that even-frequency harmonics may also pose issues (e.g., in direct conversion radios).

The distortion-source mixer 2043 functions to model the distortion of the primary mixer 2042 (e.g., as shown in FIG. 17). This output of the distortion-source mixer 2043 may then be subtracted from that of the primary mixer 2042, reducing the distortion present in the output of the primary mixer 2042.

The distortion present in the output of the primary mixer 2042 is reduced because the signal power ratio of first order components to higher order components (i.e., components of order >1, also referred to as non-linear components) in the distortion mixer output is preferably higher than in the primary mixer output, so subtracting the distortion mixer output from the primary mixer output reduces higher order components more than it reduces first order components.

The distortion-source mixer 2043 is preferably substantially similar to the primary mixer 2042 but the distortion-source mixer 2043 may be a mixer with different fundamental characteristics than the primary mixer 2042 (alternatively, they may be the same).

In a first configuration, the primary mixer 2042 and distortion-source mixer 2043 have substantially identical configuration and characteristics (e.g., input-referred third-order intercept point (IIP3), conversion gain, noise floor, frequency response) and substantially identical input signals. In this embodiment, the output of the distortion-source mixer 2043 may be attenuated relative to the primary mixer 2042 (e.g., by a scaler) and inverted (by a phase shifter) and then combined with the output of the primary mixer 2042. However, in this invention embodiment, any reduction in distortion in the primary mixer 2042 is accompanied by an equal reduction in the desired signal as well (e.g., the desired signal and distortion are both reduced by 12 dB). This configuration is not desirable.

In a second configuration, the primary mixer 2042 and distortion-source mixer 2043 have substantially identical characteristics (e.g., IIP3, conversion gain, noise floor, frequency response), but different input signals. In this configuration, the input signal to the distortion-source mixer 2043 has a higher power than that of the primary mixer 2042 (by some combination of splitting, attenuation, and/or gain). Because the third order intermodulation products roughly grow with input power to the third order (and so on for fifth and seventh order products), in this configuration, the increased input power means that the signal produced by the distortion-source mixer 2043 is more non-linear than that of the primary mixer 2042. The output of the distortion-source mixer 2043 may then be attenuated (or the primary mixer 2042 signal may be amplified) before subtraction. This may be a desirable configuration of the frequency downconverter

2040. Note that this technique may possibly be limited by the higher order intermodulation products; that is, if the signal (gain) is increased enough on the distortion-source mixer 2043 input, it may result in the addition of noise.

Note that due to manufacturing variance, substantially similar characteristics may mean that the mixers share identical characteristic specifications (e.g., each characteristic parameter has an identical center value and identical error ranges) but are not actually identical (e.g., both mixers may have an insertion loss of 3 dB plus or minus 0.5 dB, meaning that one mixer could have an insertion loss of 3.1 dB while another has an insertion loss of 2.7 dB).

A variation of the second configuration is using identical input signals but different LO signal levels. When a lower LO level is used for the distortion-source mixer its non-linearity will increase and so will the intermodulation products. Both methods described for the second configuration may be combined to optimize linearity, insertion loss, circuit complexity and noise figure.

In a third configuration, the primary mixer 2042 and distortion-source mixer 2043 have non-identical configuration and/or characteristics (e.g., IIP3, conversion gain, noise floor, frequency response, operating mode), but substantially identical input signals. For example, the primary mixer 2042 and distortion-source mixer 2043 may have similar conversion gains and noise floors, but a different IIP3. In this example, the distortion-source mixer 2043 preferably exhibits non-linearity similar in form but of a greater magnitude than of the primary mixer 2042, allowing for similar effects to the second configuration, but without necessarily suffering the same limitations of the second configuration (e.g., requiring both higher power and a mixer to handle it). In fact, in some mixers, a "low-power" mode enables the mixer to operate at a lower operating power, but with lower IIP3; the downconverter 2040 may utilize a primary mixer 2042 in "normal mode" and a distortion-source mixer 2043 in "low-power" mode in such a scenario. This may be a desirable configuration of the downconverter 2040.

The frequency downconverter 2040 may additionally or alternatively use both mixers 2042/2043 with non-identical characteristics, non-identical input signals and non-identical LO signals. Mixers 2042/2043 may be configured in any manner and are not limited to the examples given.

Note that as shown in FIG. 16, the primary mixer 2042 and distortion-source mixer 2043 share a local oscillator 2041; additionally or alternatively, the primary mixer 2042 and distortion-source mixer 2043 may utilize different local oscillator signals.

The baseband filter 2044 is preferably a lowpass filter with a tunable low-pass frequency. Additionally or alternatively, the baseband filter 2044 may be a lowpass filter with a set low-pass frequency, a bandpass filter, or any other suitable type of filter. The baseband filter 2044 is preferably a passive filter, but may additionally or alternatively be an active filter. The baseband filter 2044 is preferably implemented with analog circuit components, but may additionally or alternatively be digitally implemented.

Note that while not explicitly shown, it is understood that the downconverter 2040 may include any number of phase shifters, inverters, amplifiers, attenuators, couplers, splitters, and/or other components in order to achieve the functionality herein described. Further examples are as described in U.S. patent application Ser. No. 15/937,406, the entirety of which is incorporated by this reference.

The use of a downconversion solution with enhanced linearity can change filtering and/or other requirements of the system 2000. For example, as shown in FIG. 7, an implementation of the system 1000 performs RF filtering prior to frequency downconversion (via the TxIFS 1200). In this implementation, the TxIFS 1200 is preferably used to filter out interference present in the transmit band of a receive signal; e.g., the TxIFS 1200 includes a filter on the receive signal that allows signal components in the receive band to pass while blocking signal components in the transmit band. Here, the presence of the TxIFS 1200 reduces the signal power of signals prior to downconversion, resulting in lower non-linearity than would be possible without the TxIFS 1200.

Figure 18:
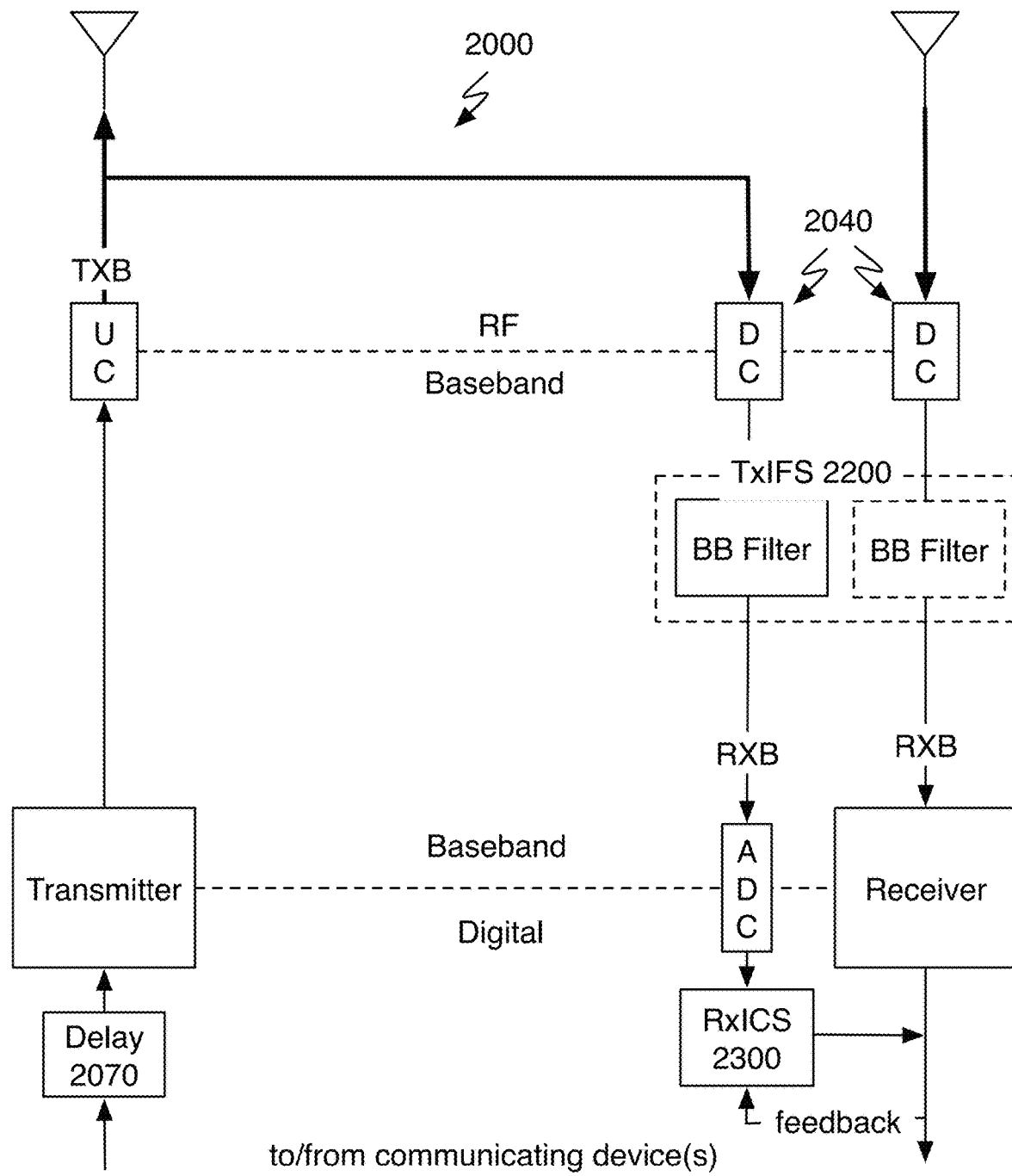
FIG. 18 is a diagram representation of a system of a preferred embodiment.

As shown in FIG. 18, use of the enhanced linearity frequency downconverter 2040 can increase the performance of a similar solution in the system 2000 where the TxIFS 2200 operates at baseband rather than at RF. Note that while the frequency downconverter 2040 includes a baseband filter 2044, in implementations such as this where baseband filtering (e.g., via a TxIFS 2200) immediately follows the output of the downconverter 2040, the latter baseband filter may perform the function of the baseband 2044 (alternatively, the downconverter 2040 may include a distinct baseband filter 2044).

Figure 19:
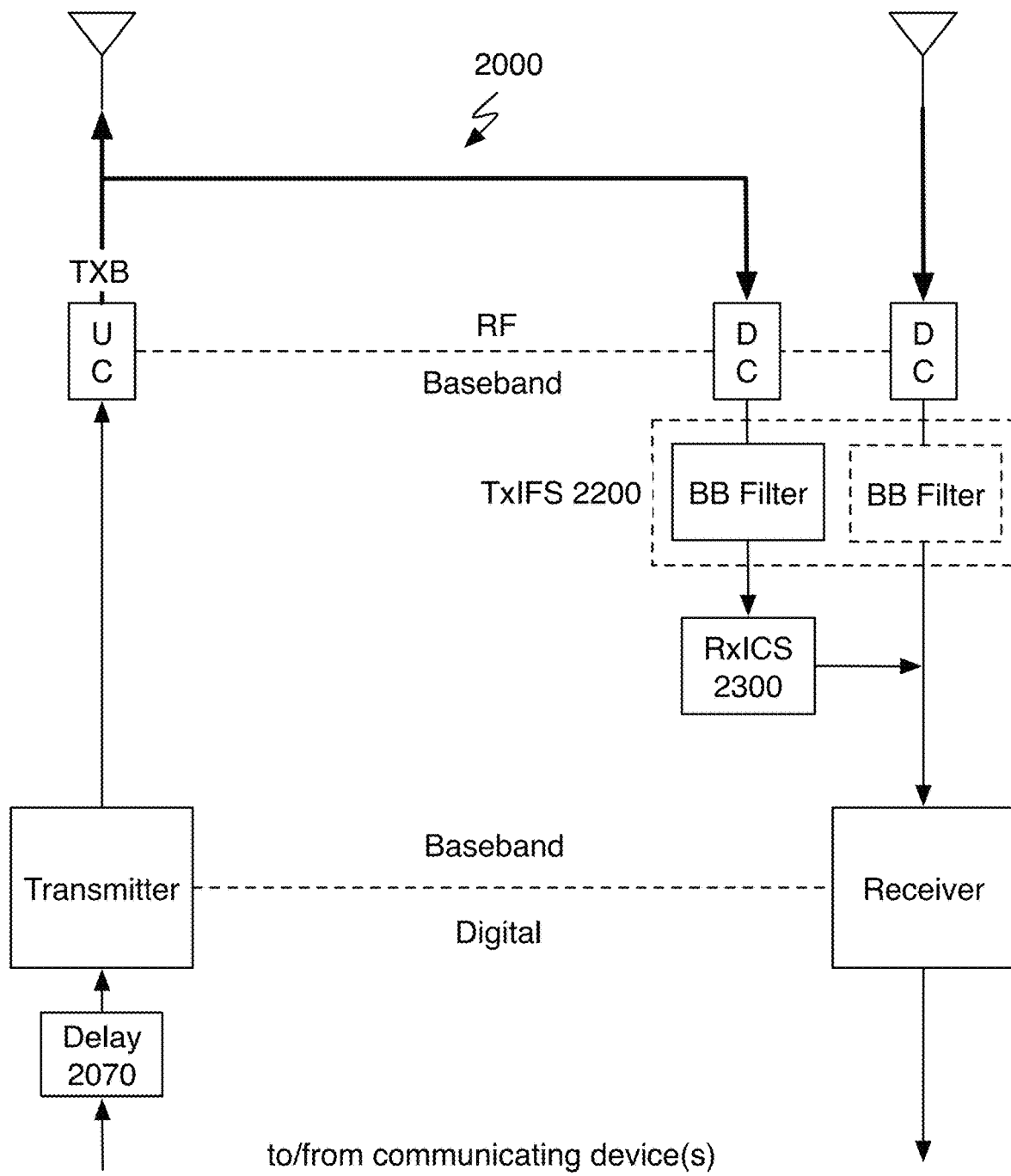
FIG. 19 is a diagram representation of a system of a preferred embodiment.
Figure 20:
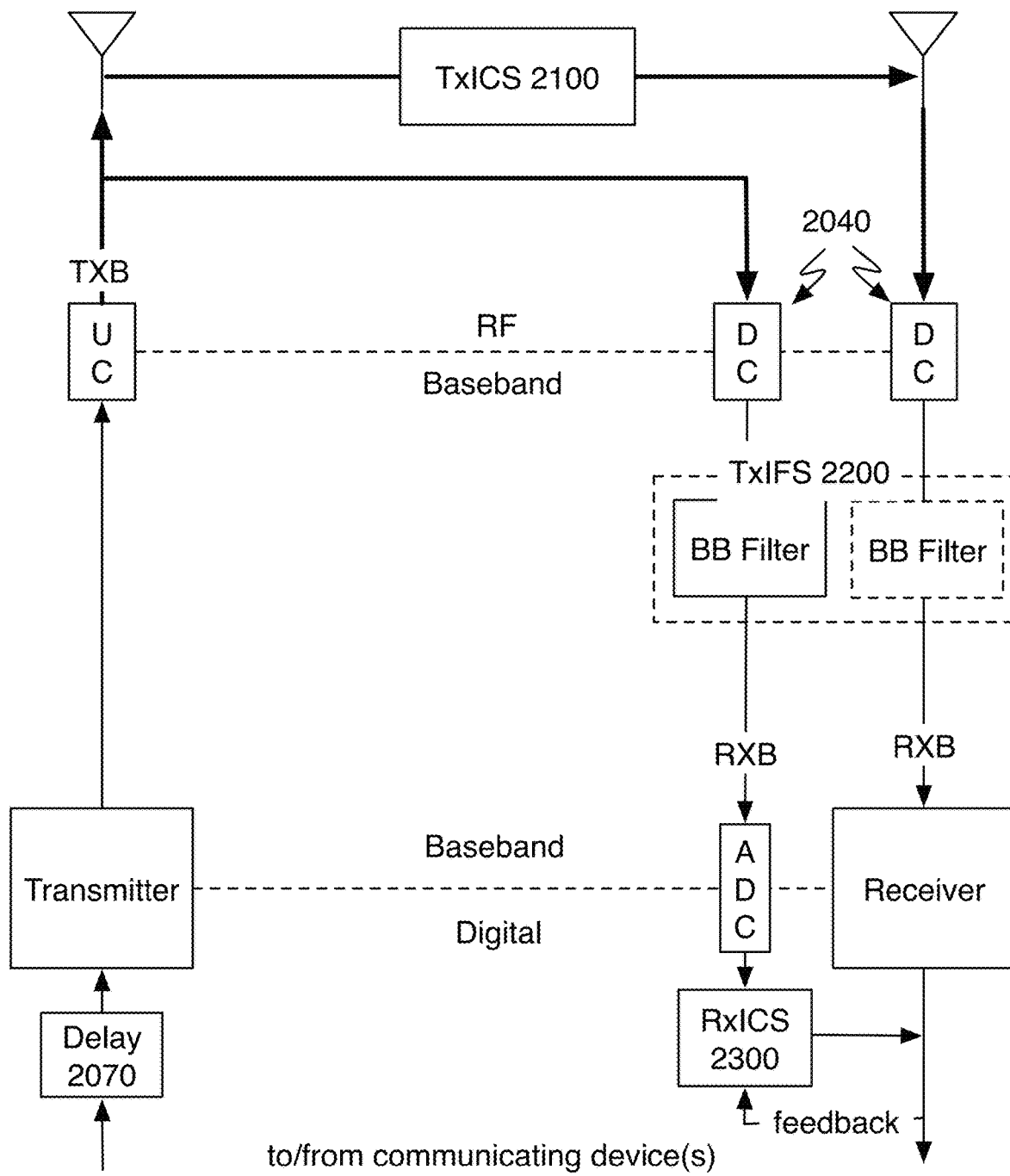
FIG. 20 is a diagram representation of a system of a preferred embodiment.
Figure 21:
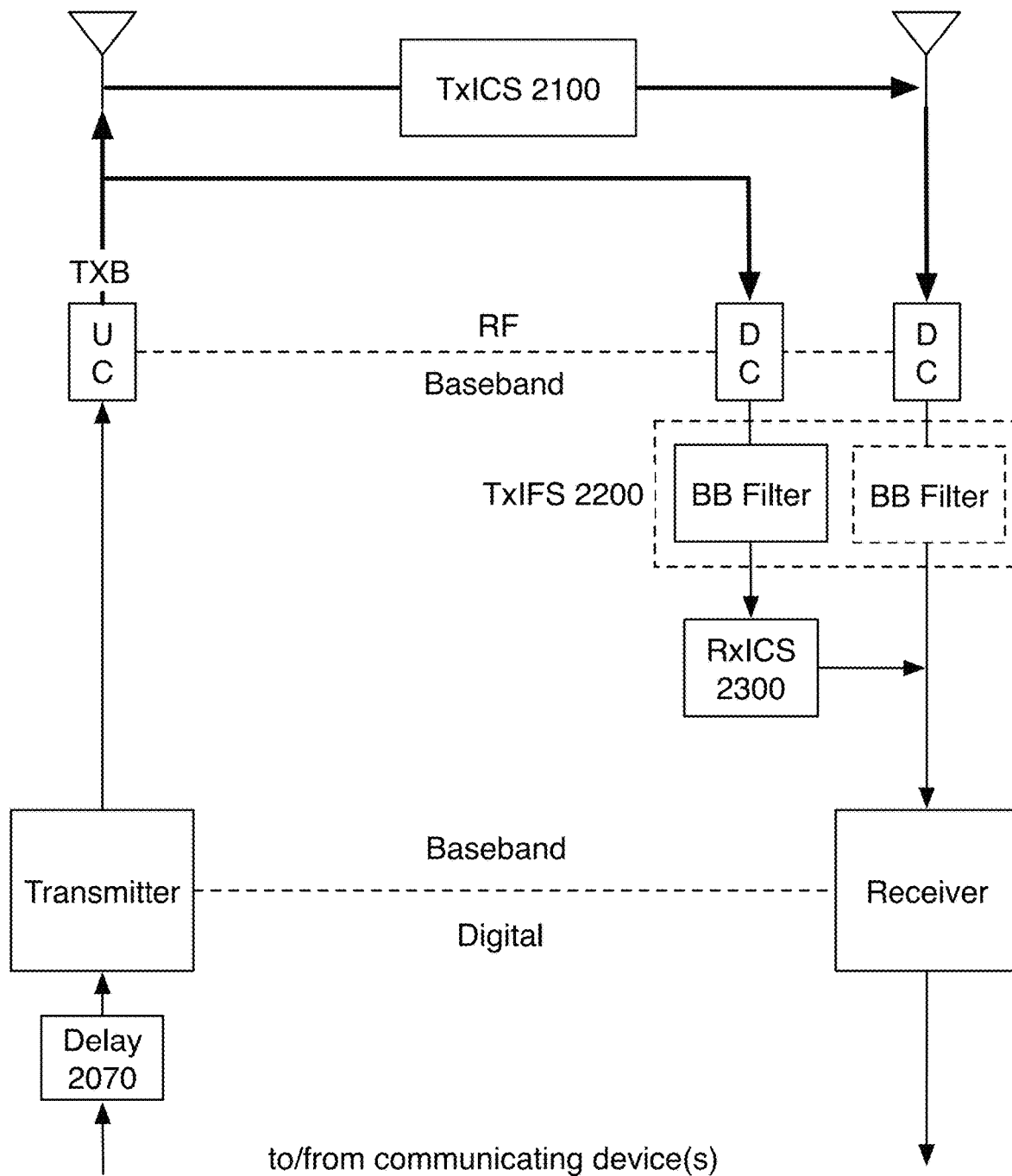
FIG. 21 is a diagram representation of a system of a preferred embodiment.

In a second implementation of an invention embodiment, receive cancellation may be performed at baseband, as shown in FIG. 19. Note that while feedback in this implementation is shown as originating post-receiver, feedback may additionally or alternatively be sourced in baseband after combination of the RxICS 2300 output and the receive signal The implementations of FIGS. 18 and 19 may likewise be combined with any of the components or signal path configurations of the system 1000. For example, the implementations of FIGS. 18 and 19 may be combined with the TxICS 2100 as shown in FIGS. 20 and 21 respectively.

The methods of the preferred embodiment and variations thereof can be embodied and/or implemented at least in part as a machine configured to receive a computer-readable medium storing computer-readable instructions. The instructions are preferably executed by computer-executable components preferably integrated with a system for wireless communication. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

We claim:

1. A system for linearized-mixer interference mitigation, comprising:
   first and second linearized frequency downconverters;
     wherein the first linearized frequency downconverter downconverts a sampled radio-frequency (RF) transmit signal to a baseband (BB) transmit signal having a first BB frequency; wherein the second linearized frequency downconverter downconverts a sampled RF receive signal to a BB receive signal having a second BB frequency; wherein each of the first and second linearized frequency downconverters comprises:

19 a primary mixer that generates a primary-mixer-output signal from a first local oscillator (LO) signal and an input signal;

a distortion-source mixer that generates a distortion-source-output signal from a second LO signal and the input signal; and an output signal coupler that generates an output signal by combining the primary-mixer-output signal and the distortion-source output signal, resulting in reduced non-linear distortion;

a sampling analog interference filtering system that, in order to remove interference in the transmit band, filters the sampled BB transmit signal to generate a cleaned BB transmit signal;

a first analog-to-digital converter that converts the cleaned BB transmit signal to a digital transmit signal;

a second analog-to-digital converter that converts the BB receive signal to a digital receive signal; and a digital interference canceller that transforms the digital transmit signal to a digital interference cancellation signal;

wherein:

the digital receive signal and the digital interference cancellation signal are combined in order to remove a first portion of receive-band interference;

the first and second BB frequencies are identical;

the sampled RF transmit signal and sampled RF receive signal have non-identical center frequencies;

each of the first and second linearized frequency downconverters further comprises an LO signal coupler that splits an input LO signal into the first and second LO signals;

the primary-mixer-output signal comprises a first-order primary-mixer-output signal component and a higher-order primary-mixer-output signal component;

the primary-mixer-output signal is characterized by a first signal power ratio of the higher-order primary-mixer-output signal component to the first-order primary-mixer-output signal component;

the distortion-source-mixer-output signal comprises a first-order distortion-mixer-output signal component and a higher-order distortion-mixer-output signal component;

the distortion-mixer-output signal is characterized by a second signal power ratio of the higher-order distortion-mixer-output signal component to the first-order distortion-mixer-output signal component; and the second signal power ratio is greater than the first signal power ratio.

2. The system of claim 1, wherein the combination of the primary-mixer-output signal and the distortion-source output signal comprises a first-order output signal component and a higher-order output signal component; wherein the output signal is characterized by a third signal power ratio of the higher-order output signal component to the first-order output signal component; wherein the third signal power ratio is lesser than the first signal power ratio and lesser than the second signal power ratio.

3. The system of claim 2, further comprising a transmit analog canceller that transforms, according to a first configuration state, the sampled RF transmit signal to a first RF interference cancellation signal; and a first receive coupler, that combines, in order to remove a first portion of interference in the transmit band and prior to frequency down-conversion, the first RF interference cancellation signal and the RF receive signal to remove a second portion of receive-band interference.

20

4. The system of claim 3, wherein the transmit analog canceller comprises a signal divider, a set of scalers and delayers, and a signal combiner.

5. The system of claim 1, further comprising a transmit analog canceller that transforms, according to a first configuration state, the sampled RF transmit signal to a first RF interference cancellation signal; and a first receive coupler, that combines, in order to remove a first portion of interference in the transmit band and prior to frequency down-conversion, the first RF interference cancellation signal and the RF receive signal to remove a second portion of receive-band interference.

6. The system of claim 5, wherein the transmit analog canceller comprises a signal divider, a set of scalers and delayers, and a signal combiner.

7. A system for linearized-mixer interference mitigation comprising:

first and second linearized frequency downconverters; wherein the first linearized frequency downconverter downconverts a sampled radio-frequency (RF) transmit signal to a baseband (BB) transmit signal having a first BB frequency; wherein the second linearized frequency downconverter downconverts a sampled RF receive signal to a BB receive signal having a second BB frequency; wherein each of the first and second linearized frequency downconverters comprises:

a primary mixer that generates a primary-mixer-output signal from a first local oscillator (LO) signal and an input signal;

a distortion-source mixer that generates a distortion-source-output signal from a second LO signal and the input signal; and an output signal coupler that generates an output signal by combining the primary-mixer-output signal and the distortion-source output signal, resulting in reduced non-linear distortion;

a sampling analog interference filtering system that, in order to remove interference in the transmit band, filters the sampled BB transmit signal to generate a cleaned BB transmit signal;

an analog interference canceller that transforms the cleaned BB transmit signal to a BB interference cancellation signal; and a first signal coupler that combines the BB interference cancellation signal and the BB receive signal in order to remove a first portion of receive-band interference;

wherein:

the first and second BB frequencies are identical;

the sampled RF transmit signal and sampled RF receive signal have non-identical center frequencies;

each of the first and second linearized frequency downconverters further comprises an LO signal coupler that splits an input LO signal into the first and second LO signals;

the primary-mixer-output signal comprises a first-order primary-mixer-output signal component and a higher-order primary-mixer-output signal component;

the primary-mixer-output signal is characterized by a first signal power ratio of the higher-order primary-mixer-output signal component to the first-order primary-mixer-output signal component;

the distortion-source-mixer-output signal comprises a first-order distortion-mixer-output signal component and a higher-order distortion-mixer-output signal component;

the distortion-mixer-output signal is characterized by a second signal power ratio of the higher-order distortion-mixer-output signal component to the first-order distortion-mixer-output signal component; and the second signal power ratio is greater than the first signal power ratio.

8. The system of claim 7, wherein the combination of the primary-mixer-output signal and the distortion-source output signal comprises a first-order output signal component and a higher-order output signal component; wherein the output signal is characterized by a third signal power ratio of the higher-order output signal component to the first-order output signal component; wherein the third signal power ratio is lesser than the first signal power ratio and lesser than the second signal power ratio.

9. The system of claim 8, further comprising a transmit analog canceller that transforms, according to a first configuration state, the sampled RF transmit signal to a first RF interference cancellation signal; and a first receive coupler, that combines, in order to remove a first portion of interference in the transmit band and prior to frequency down-conversion, the first RF interference cancellation signal and the RF receive signal to remove a second portion of receive-band interference.

10. The system of claim 9, wherein the transmit analog canceller comprises a signal divider, a set of scalers and delayers, and a signal combiner.

11. The system of claim 7, further comprising a transmit analog canceller that transforms, according to a first configuration state, the sampled RF transmit signal to a first RF interference cancellation signal; and a first receive coupler, that combines, in order to remove a first portion of interference in the transmit band and prior to frequency down-conversion, the first RF interference cancellation signal and the RF receive signal to remove a second portion of receive-band interference.

12. The system of claim 11, wherein the transmit analog canceller comprises a signal divider, a set of scalers and delayers, and a signal combiner.

* * * * *